United States Patent
Kao

(10) Patent No.: US 9,433,159 B2
(45) Date of Patent: Sep. 6, 2016

(54) HYDROPONIC SYSTEM

(76) Inventor: Chih-Cheng Kao, New Taipei (TW)

( * ) Notice: Subject to any disclaimer, the term of this patent is extended or adjusted under 35 U.S.C. 154(b) by 1090 days.

(21) Appl. No.: 13/325,499

(22) Filed: Dec. 14, 2011

(65) Prior Publication Data

US 2013/0152469 A1  Jun. 20, 2013

(51) Int. Cl.
*A01G 31/02* (2006.01)

(52) U.S. Cl.
CPC .............. *A01G 31/02* (2013.01); *Y02P 60/216* (2015.11)

(58) Field of Classification Search
CPC ...... A01G 31/02; A01G 31/06; A01G 31/00; A01G 31/001; A01G 27/006
USPC .......................................... 47/62 R, 62 N, 63
See application file for complete search history.

(56) References Cited

U.S. PATENT DOCUMENTS

| | | | | |
|---|---|---|---|---|
| 5,657,577 A | * | 8/1997 | Rodder | ............... A01G 31/02 47/64 |
| 2012/0023821 A1 | * | 2/2012 | Kao | ................. A01G 31/02 47/62 R |
| 2013/0152469 A1 | * | 6/2013 | Kao | ................. A01G 31/02 47/62 R |
| 2014/0151293 A1 | * | 6/2014 | Curry | ................. C02F 7/00 210/602 |
| 2015/0289463 A1 | * | 10/2015 | Moriarty | ........... A01G 31/02 47/62 R |

FOREIGN PATENT DOCUMENTS

| CN | 102100172 A | * | 6/2011 |
|---|---|---|---|
| JP | 2000217450 A | * | 8/2000 |

* cited by examiner

*Primary Examiner* — Monica Williams
(74) *Attorney, Agent, or Firm* — Guice Patents PLLC

(57) ABSTRACT

The present invention relates to a hydroponic system, which comprises at least a hydroponic tank and at least a level adjustment tank. The hydroponic tank and the level adjustment tank are respectively provided with at least a carrier for carrying or growing plants and at least a float. Each carrier and float is linked by a linkage mechanism. The summed fluid level of the level adjustment tank is much smaller than that of the hydroponic tank, so by filling or discharging a small amount of an adjustment solution in or out of the level adjustment tank, the height of the float in the level adjustment tank can be altered with the elevation of the fluid level; as such, the level adjustment tank can greatly save the required water amount and shorten the operation time of a water pump.

3 Claims, 20 Drawing Sheets

HYDROPONIC SYSTEM

BACKGROUND OF THE INVENTION

1. Field of the Invention

The present invention relates to a hydroponic system, especially to a hydroponic system having a plant dipping function.

2. Description of Related Art

Hydroponic techniques have been intensively used in our daily life to raise vegetables and fruits. Covering a hydroponic system with a proper net or installing a hydroponic system in a greenhouse may raise plants without any agricultural pesticides, avoiding part of plant diseases by traditional soil farming.

A conventional hydroponic system generally comprises a hydroponic tank holding a nutrient solution, and at least one rectangular carrier floating on the nutrient solution in the hydroponic tank. Each rectangular carrier has a plurality of vertical holes respectively attached with one respective perforated dish for holding seedling. The growing plants carried in the perforated dishes on the rectangular carrier can absorb water and nutrients through roots from the nutrient solution in the hydroponic tank.

Plants can absorb nutrients not only through the roots but also through the stems and leaves. Therefore, dipping growing plants in the nutrient solution in a hydroponic system facilitates the whole growing plants to absorb nutrients rapidly, eliminating the problem of slow absorption due to limited transfer of nutrients from the roots through the stems to the leaves or other tissues. As such, designing a hydroponic system allowing the roots, stems and leaves of plants all capable of being dipped in a nutrient solution for universally absorbing the nutrients required for growth is the issue that shall be concerned.

SUMMARY OF THE INVENTION

One primary object of the present invention is to provide a hydroponic system, which allows the roots, stems and leaves of plants dipped in a nutrient solution for universally absorbing the nutrients required for growth.

Another object of the present invention is to provide a hydroponic system which comprises a hydroponic tank and a level adjustment tank. Because the summed area of the fluid level of the level adjustment tank is much smaller than that of the hydroponic tank, so by filling or discharging a small amount of an adjustment solution in or out of the level adjustment tank, the height of a float in the level adjustment tank can be altered with the elevation of the fluid level, and with the linking effect provided by a drag rope, each carrier and the plants thereof in a nutrient solution of the hydroponic tank can generate a corresponding lifting/sinking movement; as such, the level adjustment tank can greatly save the required water amount and shorten the operation time of a water pump, thereby providing advantages of saving power and reducing carbon consumption.

For achieving the mentioned objects, one technical solution provided by the present invention is to provide a hydroponic system as shown from FIG. 1 to FIG. 2*b*, which comprises: at least a hydroponic tank, each hydroponic tank is filled with a nutrient solution and installed with at least a carrier for carrying or growing plants, the average specific gravity of each carrier and the plants thereof is greater than the specific gravity of the nutrient solution; at least a level adjustment tank, each level adjustment tank is filled with an adjustment solution and installed with at least a first water intake pipe and at least a first discharge pipe, the summed area of the fluid level of the level adjustment tank is smaller than that of the hydroponic tank, and at least a float is provided in the level adjustment tank, the specific gravity of the float is smaller than that of the adjustment solution, and the gross weight of the float is greater than the gross weight of the carrier and the plants thereof subtracting the total buoyancy of the carrier totally immersed in the nutrient solution; and a linkage mechanism having at least a support member installed above the hydroponic tank and the level adjustment tank, the support member is installed with at least an upper guide member corresponding to the locations of the float and the carrier, the upper guide member allows a drag rope to be installed thereon, and two ends of the drag rope are respectively connected to the float and the carrier; when the first water intake pipe or the first discharge pipe are utilized for filling or discharging the adjustment solution in or out of the level adjustment tank, the height of the float in the level adjustment tank can be altered with the elevation of the fluid level, and with the linking effect provided by the drag rope, the carrier and the plants thereof in the nutrient solution of the hydroponic tank can generate a corresponding lifting/sinking movement at a same ratio.

Another technical solution provided by the present invention is to provide a hydroponic system as shown from FIG. 3 to FIG. 4*b*, which comprises: at least a hydroponic tank, each hydroponic tank is filled with a nutrient solution and installed with at least a carrier for carrying or growing plants, the average specific gravity of each carrier and the plants thereof is greater than the specific gravity of the nutrient solution; at least a level adjustment tank, each level adjustment tank is filled with an adjustment solution and installed with at least a first water intake pipe and at least a first discharge pipe, the summed area of the fluid level of the level adjustment tank is smaller than that of the hydroponic tank, and at least a float is provided in the level adjustment tank, the specific gravity of the float is smaller than that of the adjustment solution, and the total buoyancy of the float totally immersed in the adjustment solution subtracting the gross weight of the float is greater than the gross weight of the carrier and the plants thereof subtracting the total buoyancy of the carrier totally immersed in the nutrient solution; and a linkage mechanism having at least a support member installed above the hydroponic tank and the level adjustment tank, the support member is installed with at least an upper guide member corresponding to the locations of each float and carrier, the upper guide member allows a drag rope to be installed thereon, and two ends of the drag rope are respectively connected to the float and the carrier; wherein, the bottom of the level adjustment tank is further installed with at least a turning guide member, and the drag rope passing the upper guide member passes through the turning guide member in the level adjustment tank then is connected to the float; when the first water intake pipe or the first discharge pipe are utilized for filling or discharging the adjustment solution in or out of the level adjustment tank, the height of the float in the level adjustment tank can be altered with the elevation of the fluid level, and with the linking effect provided by the drag rope, the carrier and the plants thereof in the nutrient solution of the hydroponic tank can generate a corresponding lifting/sinking movement at a same ratio.

One another technical solution provided by the present invention is to provide a hydroponic system as shown from FIG. 12*a* to FIG. 12*b*, which comprises: at least a hydroponic tank, each hydroponic tank is filled with a nutrient solution and installed with at least a carrier for carrying or growing plants, the average specific gravity of each carrier and the plants thereof is smaller than the specific gravity of the nutrient solution; at least a level adjustment tank, each level adjustment tank is filled with an adjustment solution and installed with at least a first water intake pipe and at least a first discharge pipe, the summed area of the fluid level of the level adjustment tank is smaller than that of the hydroponic tank, and at least a float is provided in the level adjustment tank, the specific gravity of the float is smaller than that of the adjustment solution, and the gross weight of the float is greater than the total buoyancy of the carrier and the plants thereof totally immersed in the nutrient solution subtracting the gross weight of the carrier and the plants thereof; and a linkage mechanism having at least a lower guide member installed at the bottom of the hydroponic tank and having at least a support member installed above the hydroponic tank and the level adjustment tank, the support member is provided with at least an upper guide member between the float and the carrier, the upper and lower guide members allow a drag rope to be installed thereon, and two ends of the drag rope are respectively connected to the float and the carrier; when the first water intake pipe or the first discharge pipe are utilized for filling or discharging the adjustment solution in or out of the level adjustment tank, the height of the float in the level adjustment tank can be altered with the elevation of the fluid level, and with the linking effect provided by the drag rope, the carrier and the plants thereof in the nutrient solution of the hydroponic tank can generate a corresponding lifting/sinking movement at a same ratio.

Still one another technical solution provided by the present invention is to provide a hydroponic system as shown from FIG. 10a to FIG. 10b, which comprises: at least a hydroponic tank, each hydroponic tank is filled with a nutrient solution and installed with at least a carrier for carrying or growing plants, the average specific gravity of each carrier and the plants thereof is smaller than the specific gravity of the nutrient solution; at least a level adjustment tank, each level adjustment tank is filled with an adjustment solution and installed with at least a first water intake pipe and at least a first discharge pipe, the summed area of the fluid level of the level adjustment tank is smaller than that of the hydroponic tank, and at least a float is provided in the level adjustment tank, the specific gravity of the float is smaller than that of the adjustment solution, and the total buoyancy of the float totally immersed in the adjustment solution subtracting the gross weight of the float is greater than the total buoyancy of the carrier and the plants thereof totally immersed in the nutrient solution subtracting the gross weight of the carrier and the plants thereof; and a linkage mechanism having at least a lower guide member installed at the bottom of the hydroponic tank and having at least a support member installed above the hydroponic tank and the level adjustment tank, the support member is provided with at least an upper guide member between the float and the carrier, the upper and lower guide members allow a drag rope to be installed thereon, and two ends of the drag rope are respectively connected to the float and the carrier; wherein, the bottom of the level adjustment tank is further installed with at least a turning guide member, and the drag rope passing the upper guide member passes through the turning guide member in the level adjustment tank then is connected to the float; when the first water intake pipe or the first discharge pipe are utilized for filling or discharging the adjustment solution in or out of the level adjustment tank, the height of the float in the level adjustment tank can be altered with the elevation of the fluid level, and with the linking effect provided by the drag rope, the carrier and the plants thereof in the nutrient solution of the hydroponic tank can generate a corresponding lifting/sinking movement at a same ratio.

Still one another technical solution provided by the present invention is to provide a hydroponic system as shown from FIG. 5 to FIG. 7b, which comprises: at least a hydroponic tank, each hydroponic tank is filled with a nutrient solution and installed with at least a carrier for carrying or growing plants, the average specific gravity of each carrier and the plants thereof is greater than the specific gravity of the nutrient solution; at least a level adjustment tank, each level adjustment tank is filled with an adjustment solution and installed with at least a first water intake pipe and at least a first discharge pipe, the summed area of the fluid level of the level adjustment tank is smaller than that of the hydroponic tank, and at least a float is provided in the level adjustment tank, the specific gravity of the float is smaller than that of the adjustment solution, and the gross weight of the float is greater than the gross weight of the carrier and the plants thereof subtracting the total buoyancy of the carrier totally immersed in the nutrient solution then multiplying the circumference ratio between a large and a small reels; and a linkage mechanism having at least a support member installed above the hydroponic tank and the level adjustment tank, the support member is provided with at least a take-up mechanism, each take-up mechanism includes a small reel and at least a large reel, the circumference ratio between the small and the large reels is 1:≥1, and free ends of a first and a second drag ropes wound on the small and the large reels are respectively connected to the float and the carrier; when the first water intake pipe or the first discharge pipe are utilized for filling or discharging the adjustment solution in or out of the level adjustment tank, the height of the float in the level adjustment tank can be altered with the elevation of the fluid level, and with the linking effect provided by the first and the second drag ropes and the small and the large reels being rotated through a same angle, the carrier and the plants thereof in the nutrient solution of the hydroponic tank can generate a lifting/sinking movement corresponding to the circumference between the large and the small reels multiplying the displace ratio of the altered height.

Still one another technical solution provided by the present invention is to provide a hydroponic system as shown from FIG. 8, which comprises: at least a hydroponic tank, each hydroponic tank is filled with a nutrient solution and installed with at least a carrier for carrying or growing plants, the average specific gravity of each carrier and the plants thereof is greater than the specific gravity of the nutrient solution; at least a level adjustment tank, each level adjustment tank is filled with an adjustment solution and installed with at least a first water intake pipe and at least a first discharge pipe, the summed area of the fluid level of the level adjustment tank is smaller than that of the hydroponic tank, and at least a float is provided in the level adjustment tank, the specific gravity of the float is smaller than that of the adjustment solution, and the total buoyancy of the float totally immersed in the adjustment solution subtracting the gross weight of the float is greater than the gross weight of the carrier and the plants thereof subtracting the total buoyancy of the carrier totally immersed in the nutrient solution then multiplying the circumference ratio between a large and a small reels; and a linkage mechanism having at least a support member installed above the hydroponic tank and the level adjustment tank, the support member is provided with at least a take-up mechanism, each take-up mechanism includes a small reel and at least a large reel, the circumference ratio between the small and the large reels is 1:≥1, and free ends of a first and a second drag ropes wound on the small and the large reels are respectively connected to the float and the carrier; wherein, the bottom of the level adjustment tank is further installed with at least a turning guide member, and the first drag rope passes through the turning guide member in the level adjustment tank then is connected to the float; accordingly, by the first water intake pipe or the first discharge pipe being utilized for filling or discharging the adjustment solution in or out of the level adjustment tank, the height of the float in the level adjustment tank can be altered with the elevation of the fluid level, and with the linking effect provided by the first and the second drag ropes and the small and the large reels being rotated through a same angle, the carrier and the plants thereof in the nutrient solution of the hydroponic tank can generate a lifting/sinking movement corresponding to the circumference between the large and the small reels multiplying the displace ratio of the altered height.

Still one another technical solution provided by the present invention is to provide a hydroponic system as shown from FIG. 14, which comprises: at least a hydroponic tank, each hydroponic tank is filled with a nutrient solution and installed with at least a carrier for carrying or growing plants, the average specific gravity of each carrier and the plants thereof is smaller than the specific gravity of the nutrient solution; at least a level adjustment tank, each level adjustment tank is filled with an adjustment solution and installed with at least a first water intake pipe and at least a first discharge pipe, the summed area of the fluid level of the level adjustment tank is smaller than that of the hydroponic tank, and at least a float is provided in the level adjustment tank, the specific gravity of the float is smaller than that of the adjustment solution, and the gross weight of the float is greater than the total buoyancy of the carrier and the plants thereof totally immersed in the nutrient solution subtracting the gross weight of the carrier and the plants thereof then multiplying the circumference ratio between a large and a small reels; and a linkage mechanism having at least a lower guide member installed at the bottom of the hydroponic tank and having at least a support member installed above the hydroponic tank and the level adjustment tank, the support member is provided with at least a take-up mechanism, each take-up mechanism includes a small reel and at least a large reel, the circumference ratio between the small and the large reels is 1:≥1, and a free end of a first drag rope wound on the small reel is connected to the float, and a free end of a second drag rope wound on the large reel passes through the lower guide member then is connected to the carrier; when the first water intake pipe or the first discharge pipe are utilized for filling or discharging the adjustment solution in or out of the level adjustment tank, the height of the float in the level adjustment tank can be altered with the elevation of the fluid level, and with the linking effect provided by the first and the second drag ropes and the small and the large reels being rotated through a same angle, the carrier and the plants thereof in the nutrient solution of the hydroponic tank can generate a lifting/sinking movement corresponding to the circumference between the large and the small reels multiplying the displace ratio of the altered height.

Still one another technical solution provided by the present invention is to provide a hydroponic system as shown from FIG. 13a to FIG. 13b, which comprises: at least a hydroponic tank, each hydroponic tank is filled with a nutrient solution and installed with at least a carrier for carrying or growing plants, the average specific gravity of each carrier and the plants thereof is smaller than the specific gravity of the nutrient solution; at least a level adjustment tank, each level adjustment tank is filled with an adjustment solution and installed with at least a first water intake pipe and at least a first discharge pipe, the summed area of the fluid level of the level adjustment tank is smaller than that of the hydroponic tank, and at least a float is provided in the level adjustment tank, the specific gravity of the float is smaller than that of the adjustment solution, and the total buoyancy of the float totally immersed in the adjustment solution subtracting the gross weight of the float is greater than the total buoyancy of the carrier and the plants thereof totally immersed in the nutrient solution subtracting the gross weight of the carrier and the plants thereof then multiplying the circumference ratio between a large and a small reels; and a linkage mechanism having at least a lower guide member installed at the bottom of the hydroponic tank and having at least a support member installed above the hydroponic tank and the level adjustment tank, the support member is provided with at least a take-up mechanism, each take-up mechanism includes a small reel and at least a large reel, the circumference ratio between the small and the large reels is 1:≥1, and a free end of a first drag rope wound on the small reel is connected to the float, and a free end of a second drag rope wound on the large reel passes through the lower guide member then is connected to the carrier; wherein, the bottom of the level adjustment tank is further installed with at least a turning guide member, and the first drag rope passes through the turning guide member in the level adjustment tank then is connected to the float; when the first water intake pipe or the first discharge pipe are utilized for filling or discharging the adjustment solution in or out of the level adjustment tank, the height of the float in the level adjustment tank can be altered with the elevation of the fluid level, and with the linking effect provided by the first and the second drag ropes and the small and the large reels being rotated through a same angle, the carrier and the plants thereof in the nutrient solution of the hydroponic tank can generate a lifting/sinking movement corresponding to the circumference between the large and the small reels multiplying the displace ratio of the altered height.

DETAILED DESCRIPTION OF THE PREFERRED EMBODIMENT

Figure 1:
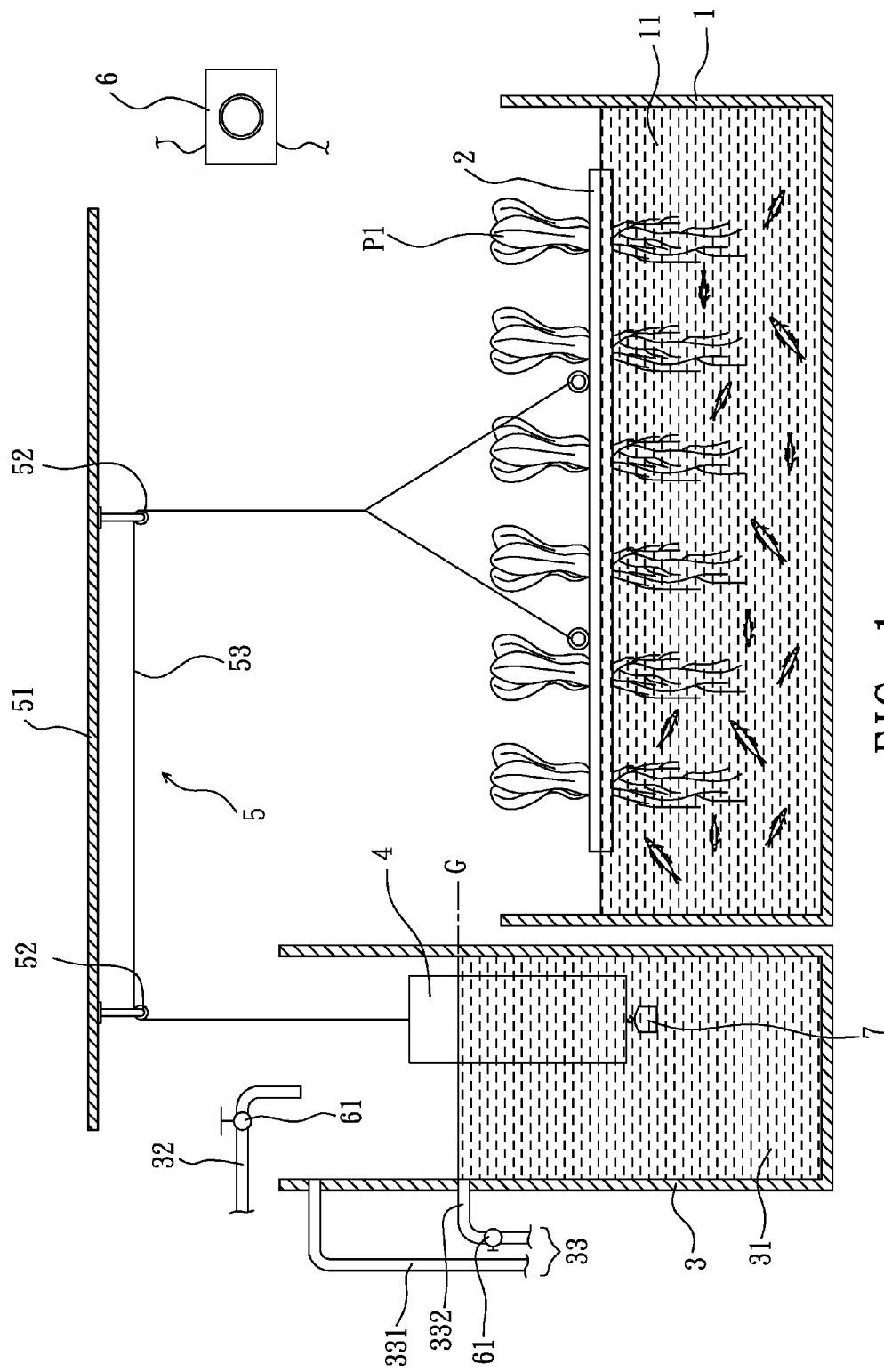
FIG. 1 is a schematic view illustrating a first embodiment of the hydroponic system provided by the present invention.
Figure 2A:
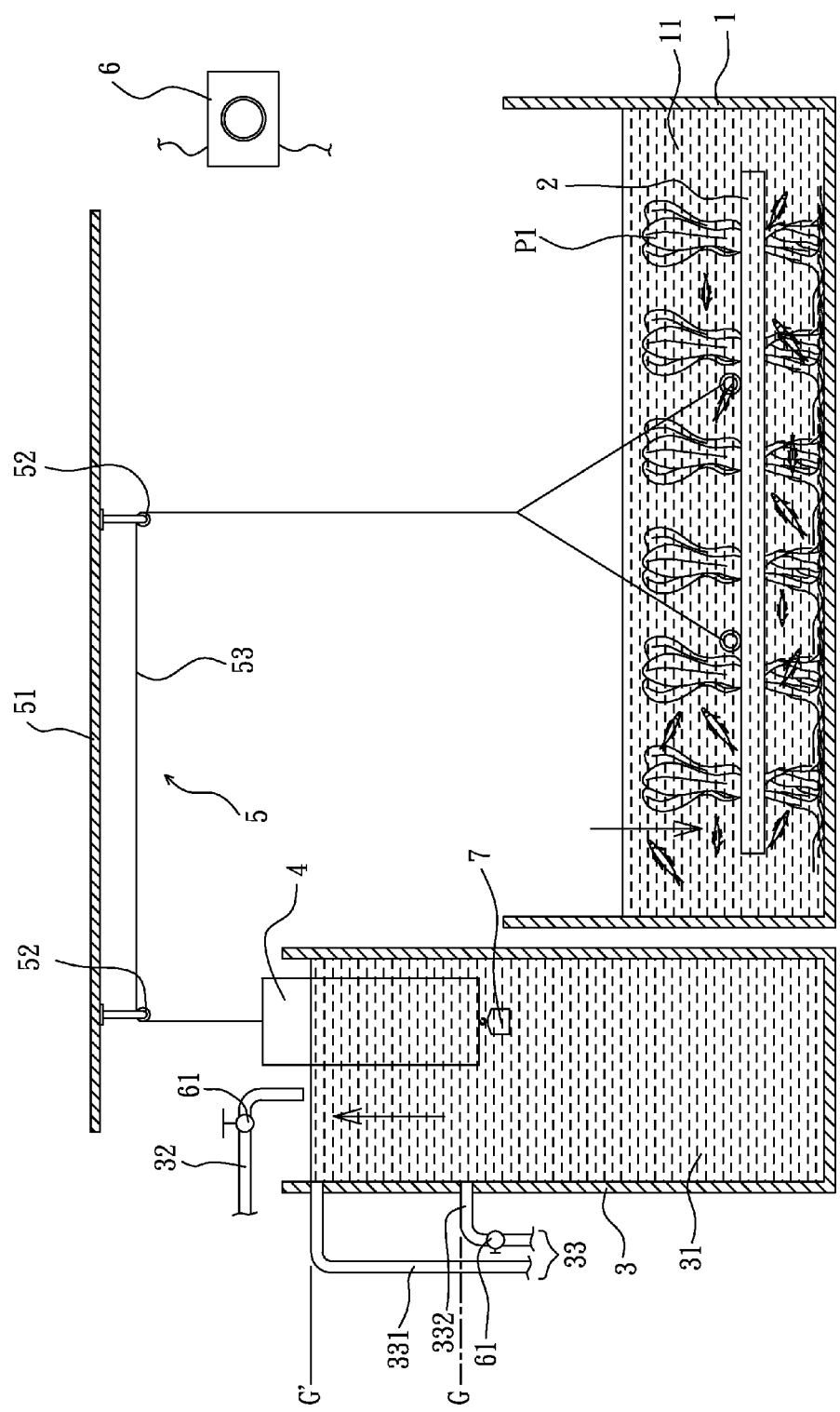
FIG. 2a is a schematic view illustrating the carrier being dipped in the nutrient solution in accordance with the first embodiment of the present invention.
Figure 2B:
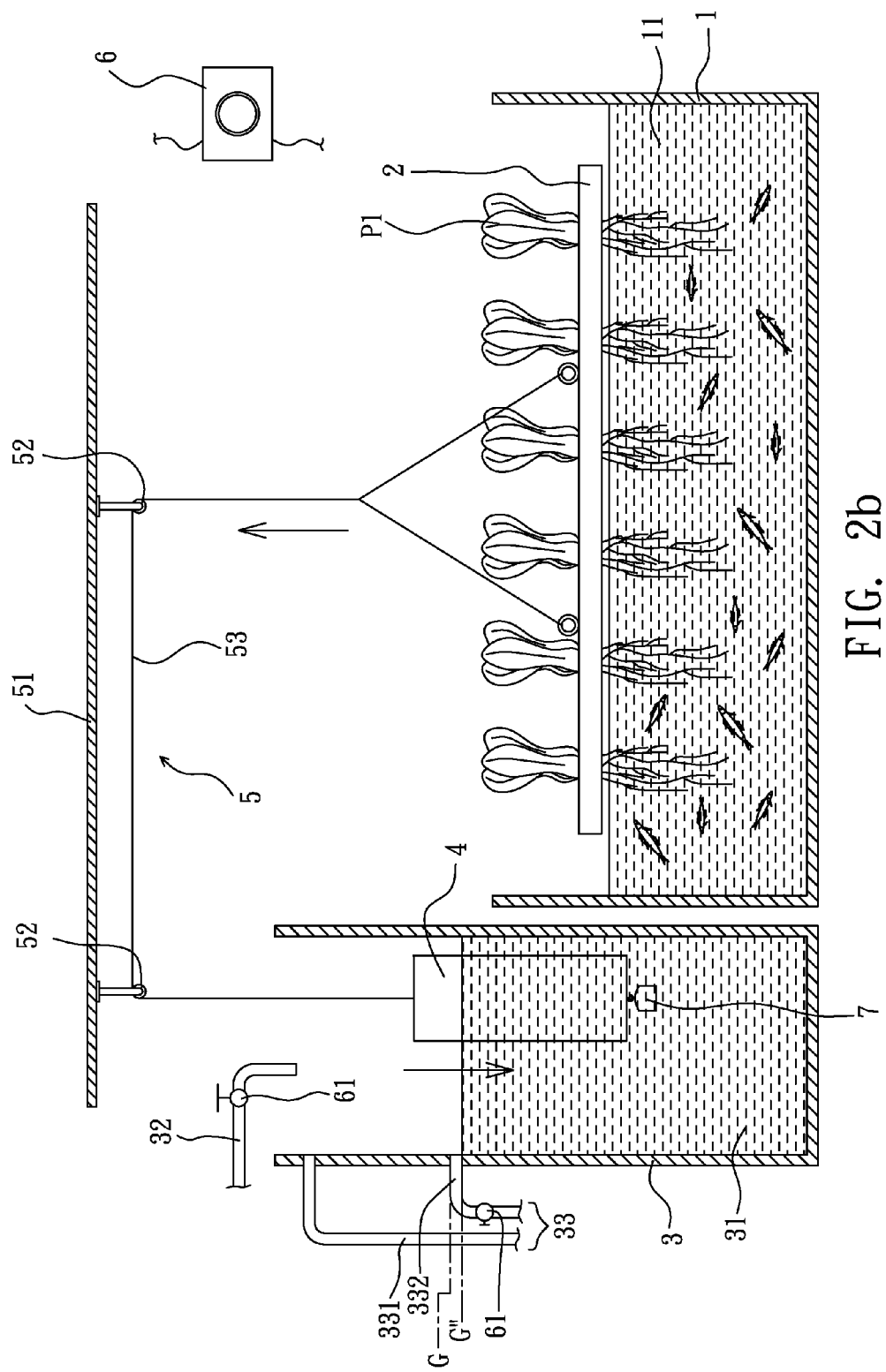
FIG. 2b is a schematic view illustrating the roots of the plants being exposed to the outside air in accordance with the first embodiment of the present invention.
Figure 3:
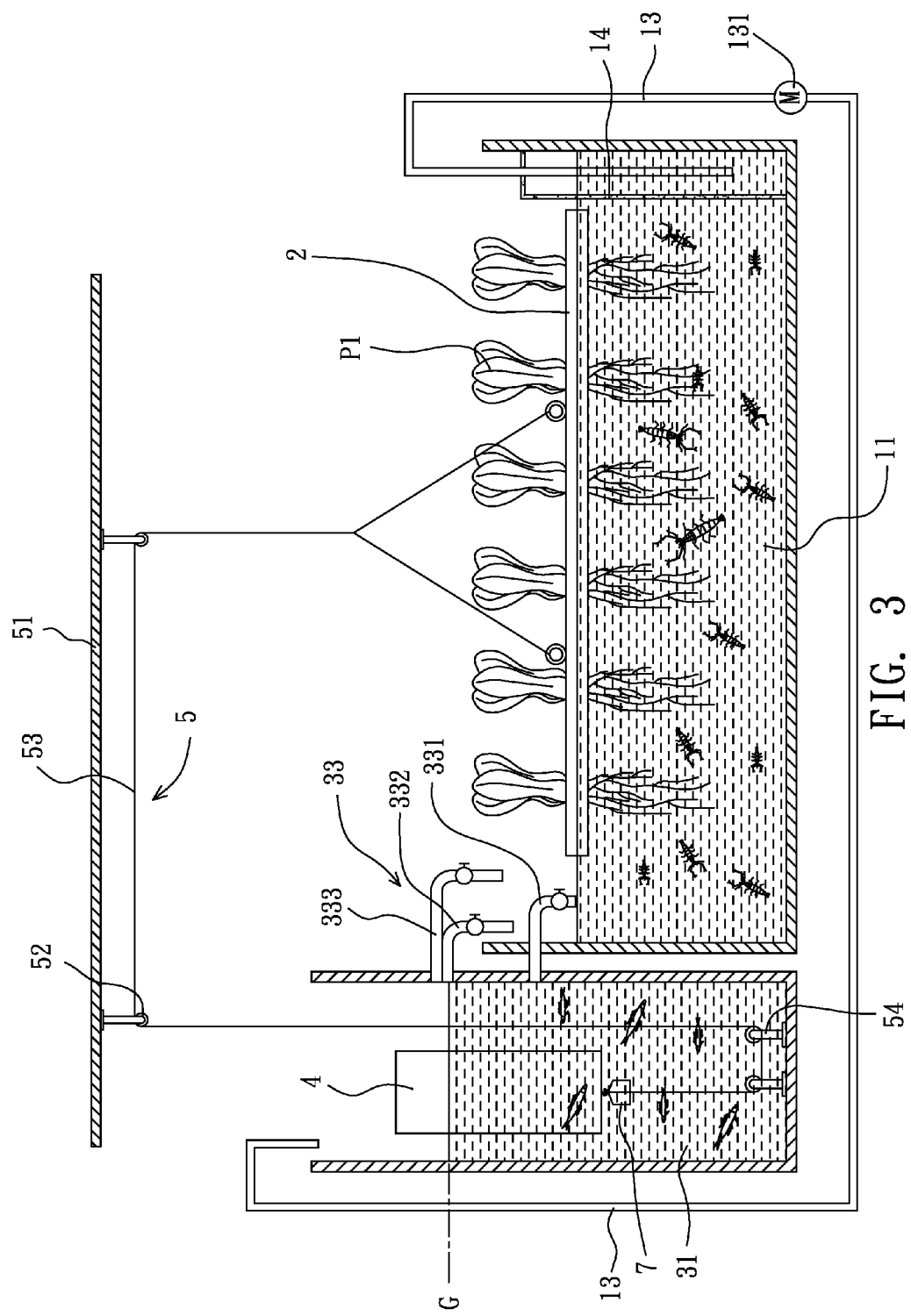
FIG. 3 is a schematic view illustrating a first alternate form of the hydroponic system in accordance with the first embodiment of the present invention.
Figure 4A:
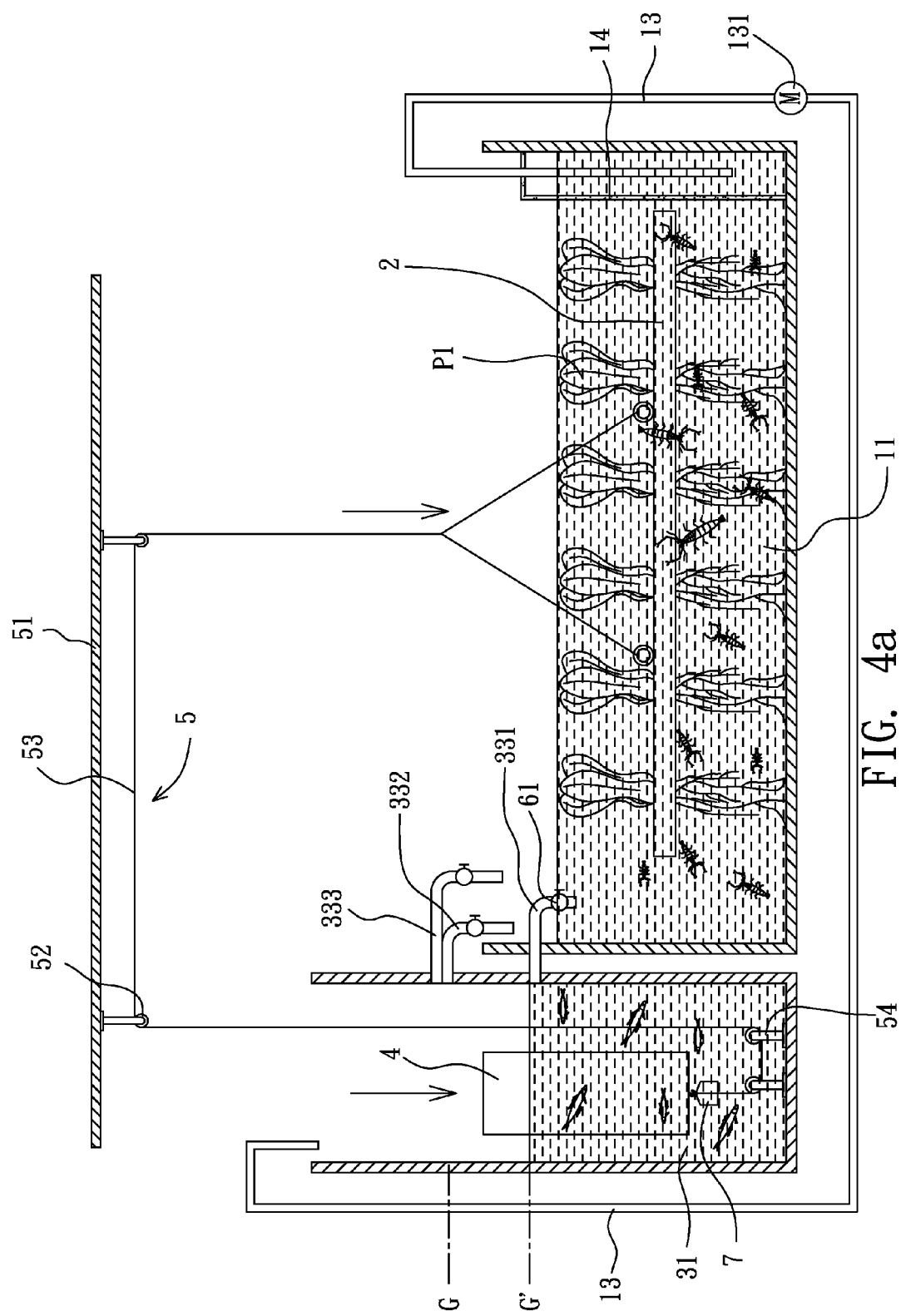
FIG. 4a is a schematic view illustrating the carrier being dipped in the nutrient solution, in accordance with the alternate embodiment shown in FIG. 3.
Figure 4B:
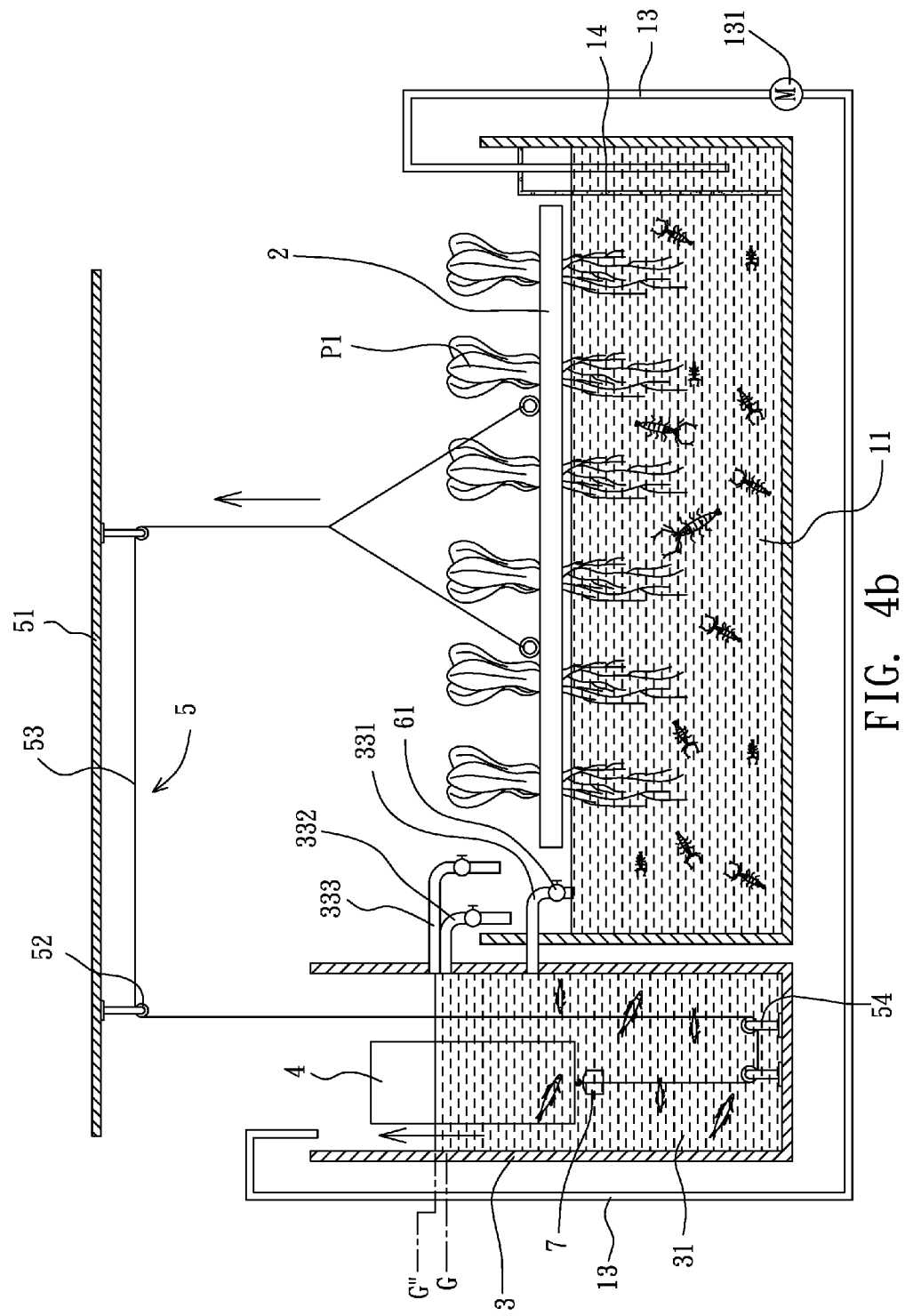
FIG. 4b is a schematic view illustrating the roots of the plants being exposed to the outside air in accordance with the alternate embodiment shown in FIG. 3.
Figure 5:
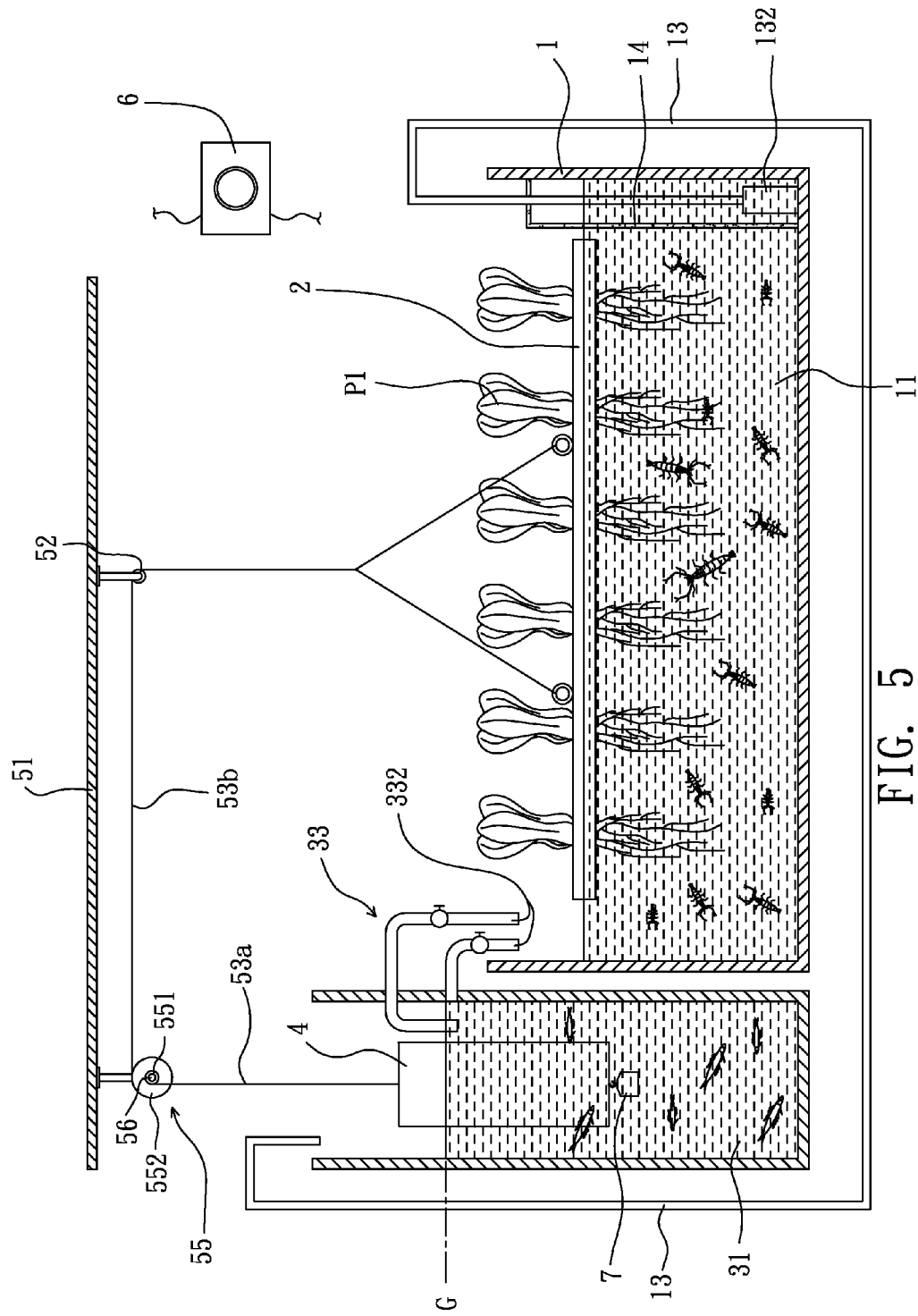
FIG. 5 is a schematic view illustrating a second embodiment of the hydroponic system provided by the present invention.
Figure 6:
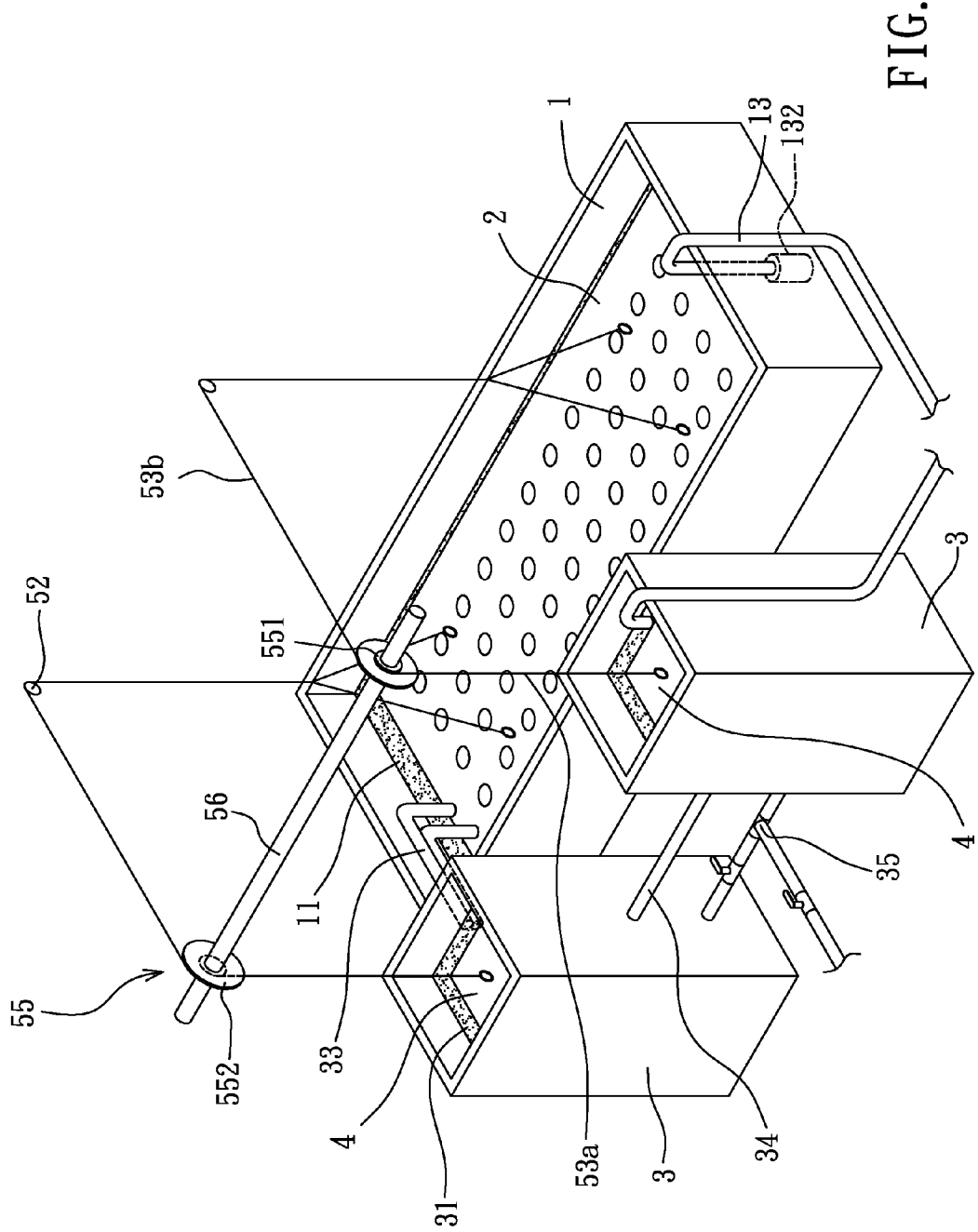
FIG. 6 is a schematic perspective illustrating the second embodiment of the hydroponic system provided by the present invention.
Figure 7A:
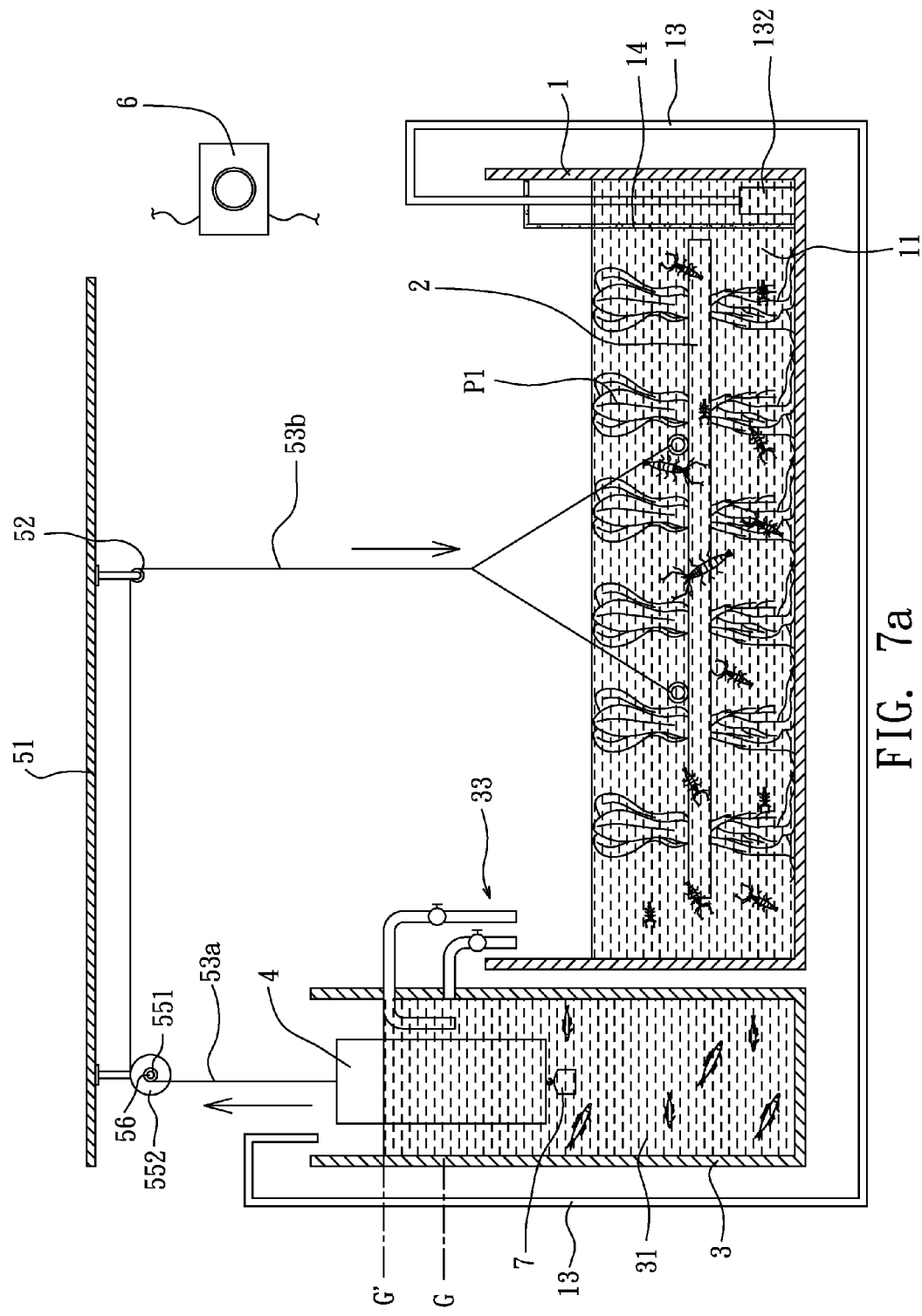
FIG. 7a is a schematic view illustrating the carrier being dipped in the nutrient solution in accordance with the second embodiment of the present invention.
Figure 7B:
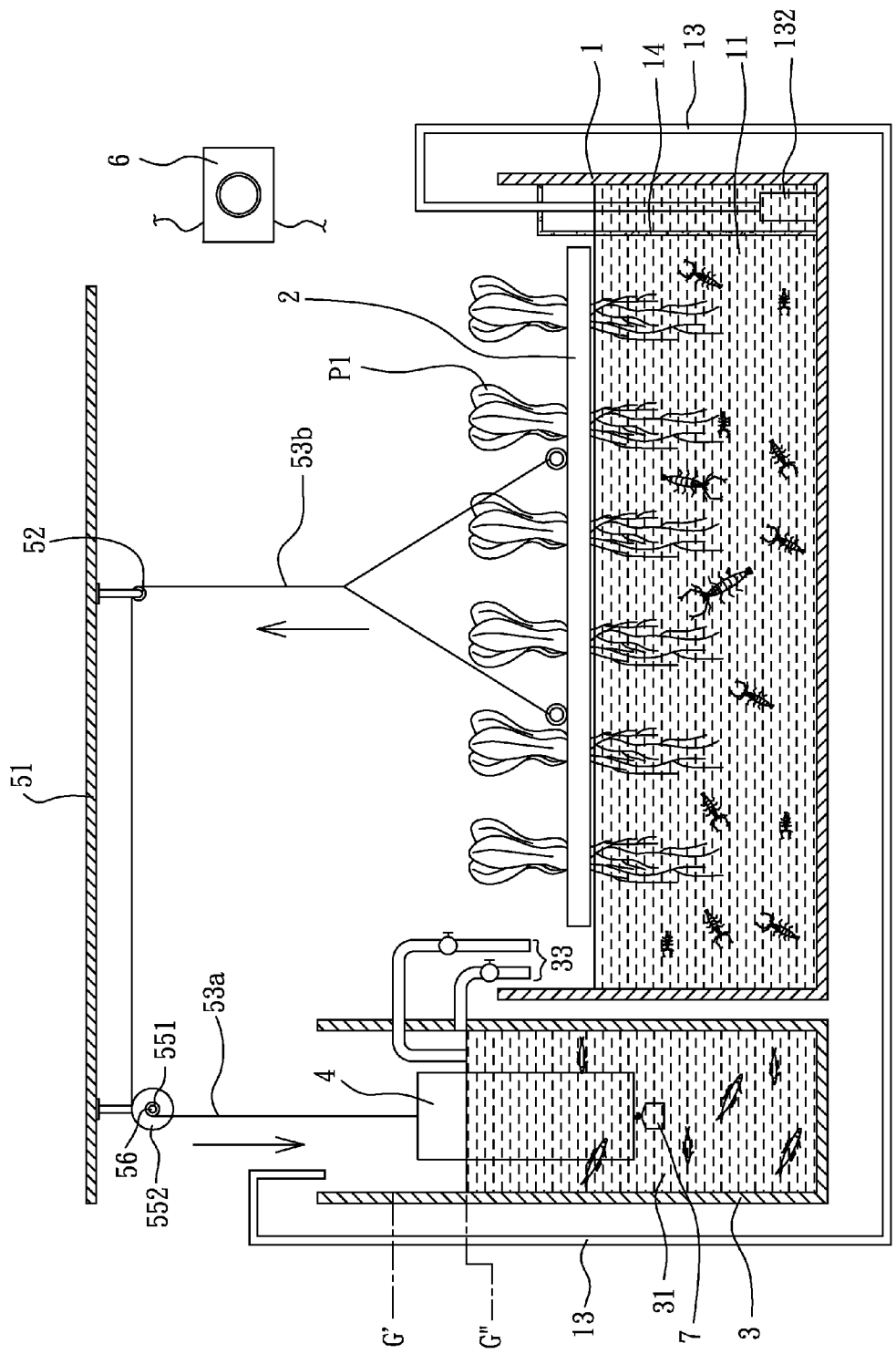
FIG. 7b is a schematic view illustrating the roots of the plants being exposed to the outside air in accordance with the second embodiment of the present invention.
Figure 8:
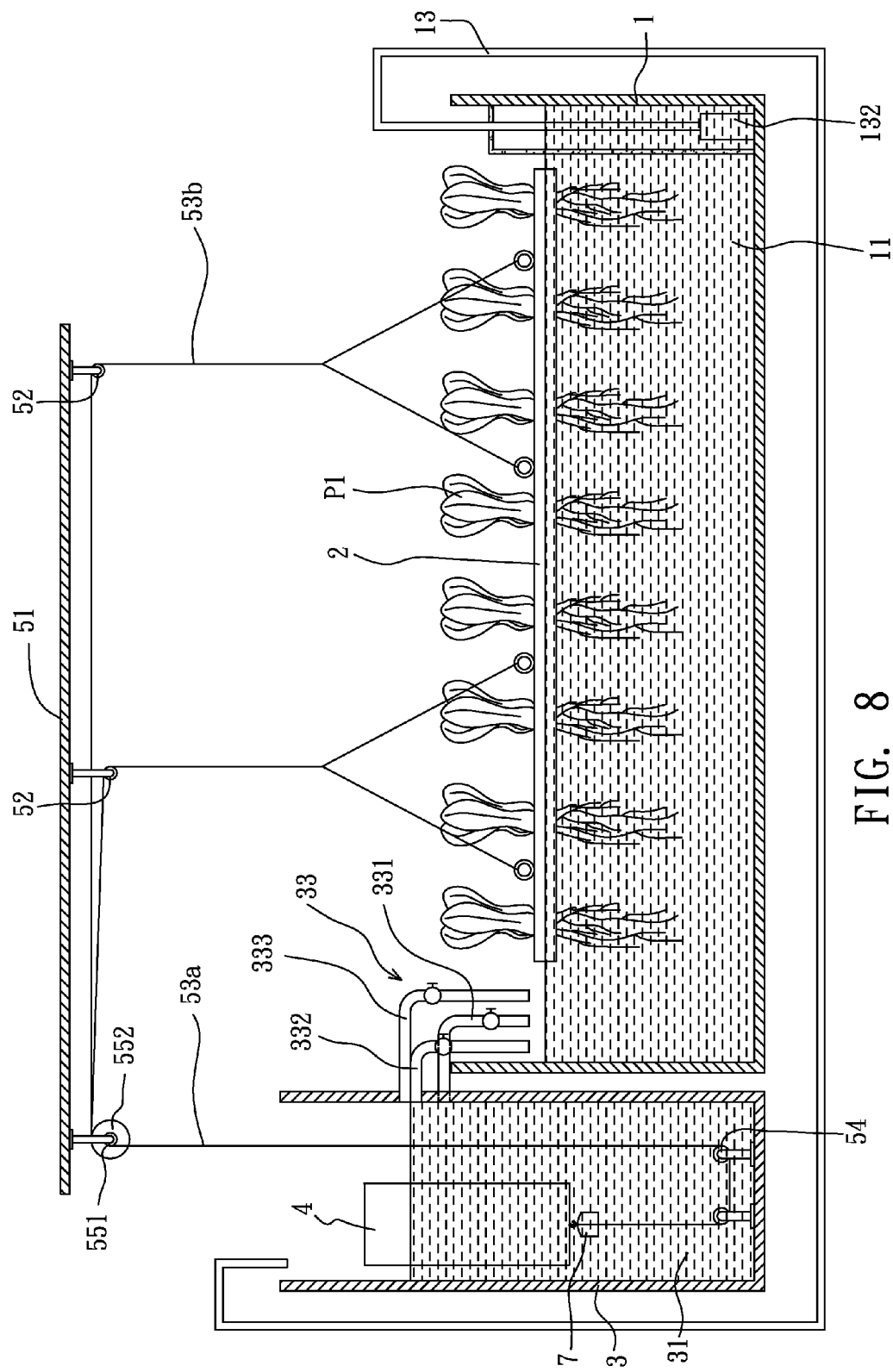
FIG. 8 is a schematic view illustrating a first alternate form of the hydroponic system in accordance with the second embodiment of the present invention.
Figure 9:
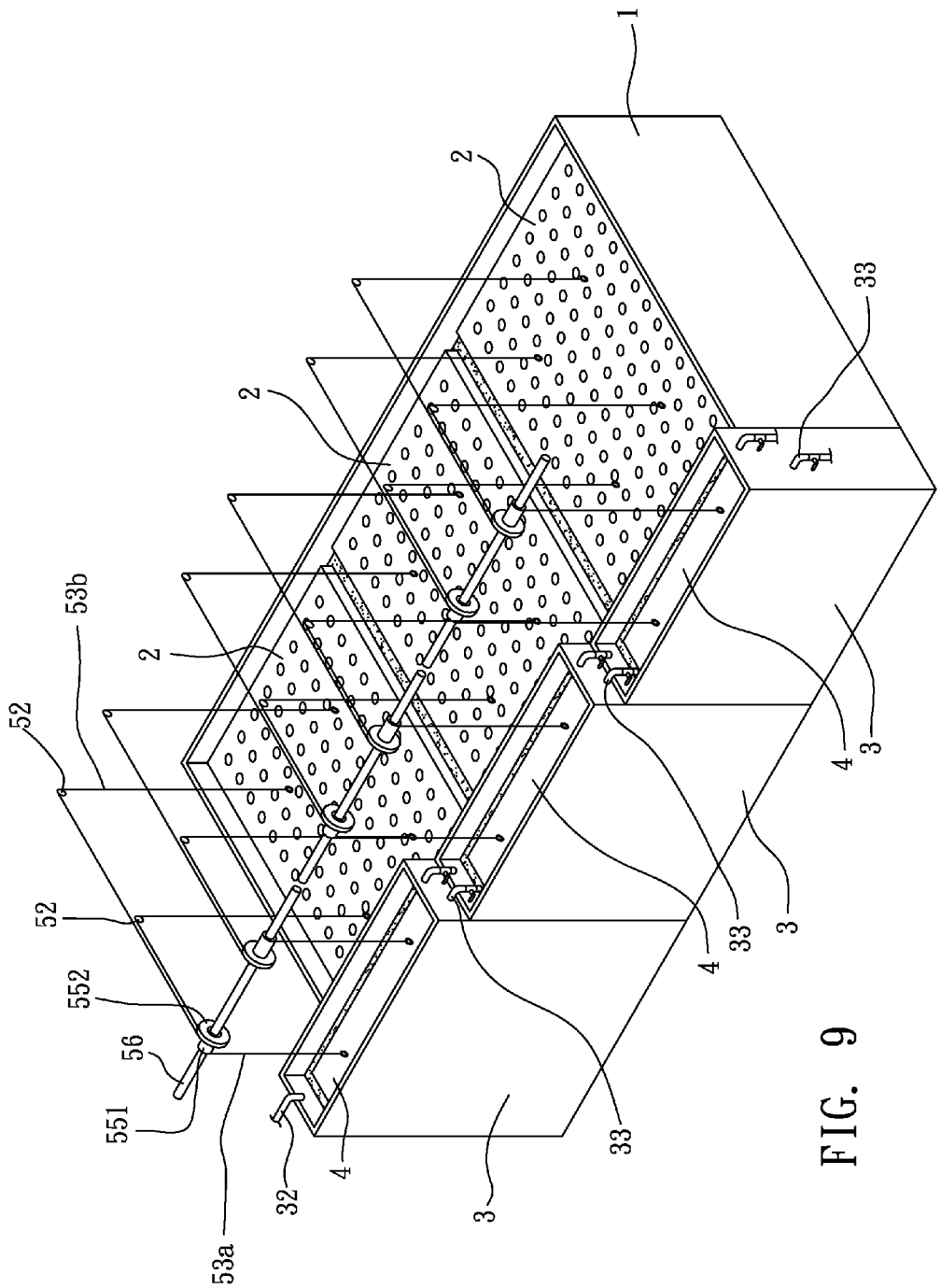
FIG. 9 is a schematic view illustrating a second alternate form of the hydroponic system in accordance with the second embodiment of the present invention.
Figure 10A:
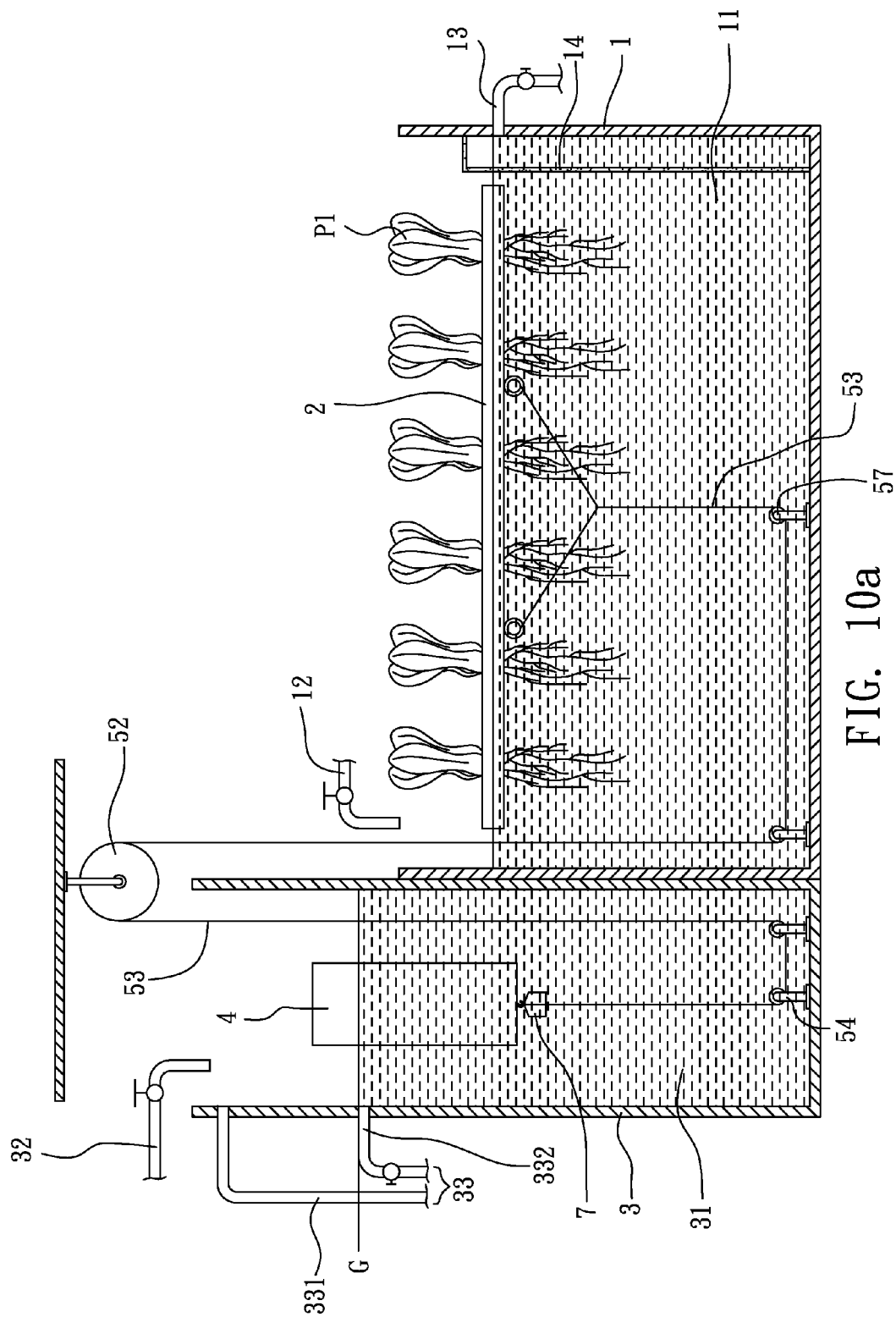
FIG. 10a is a schematic view illustrating a third embodiment of the hydroponic system provided by the present invention.
Figure 10B:
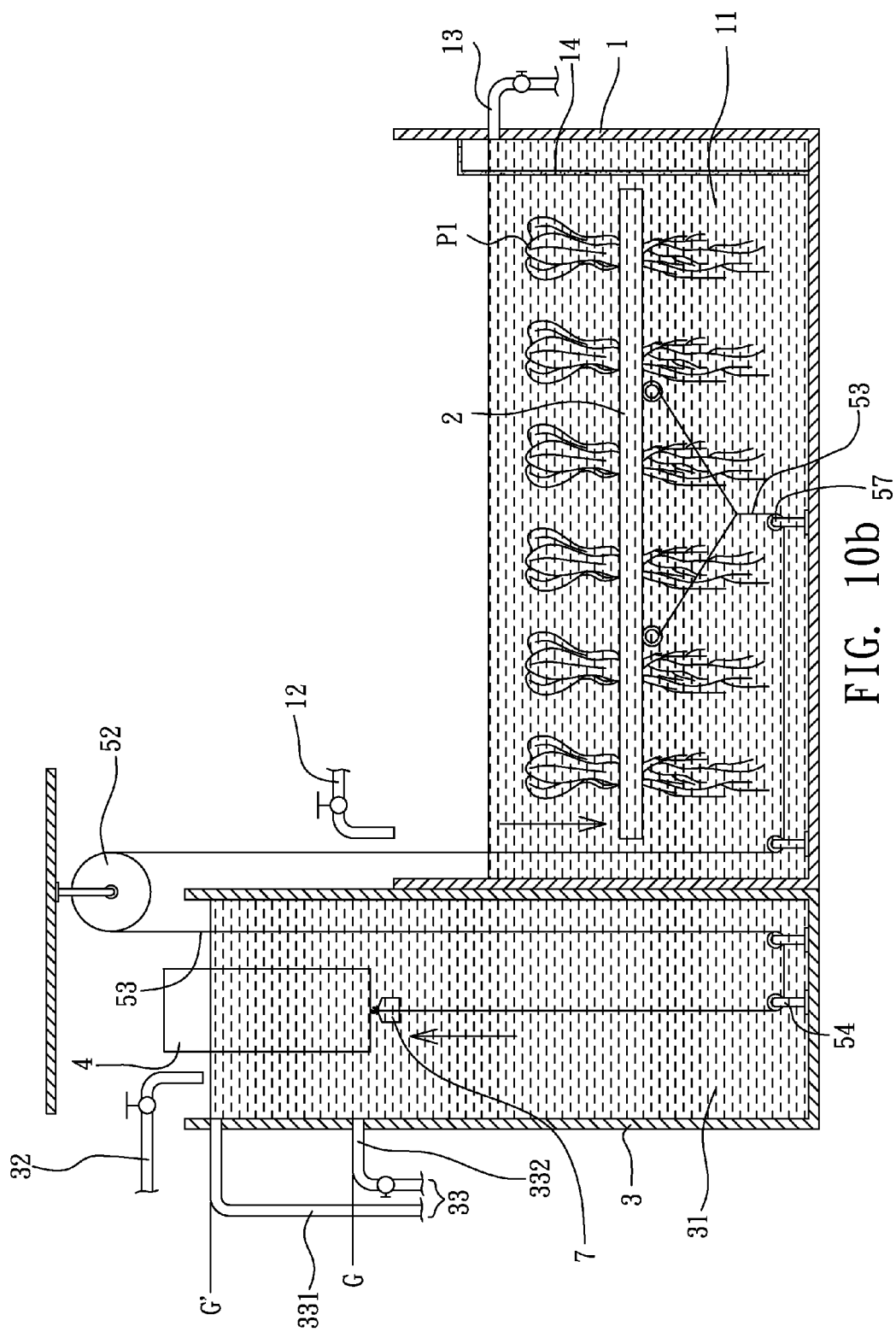
FIG. 10b is a schematic view illustrating the carrier being dipped in the nutrient solution in accordance with the third embodiment of the present invention.
Figure 11:
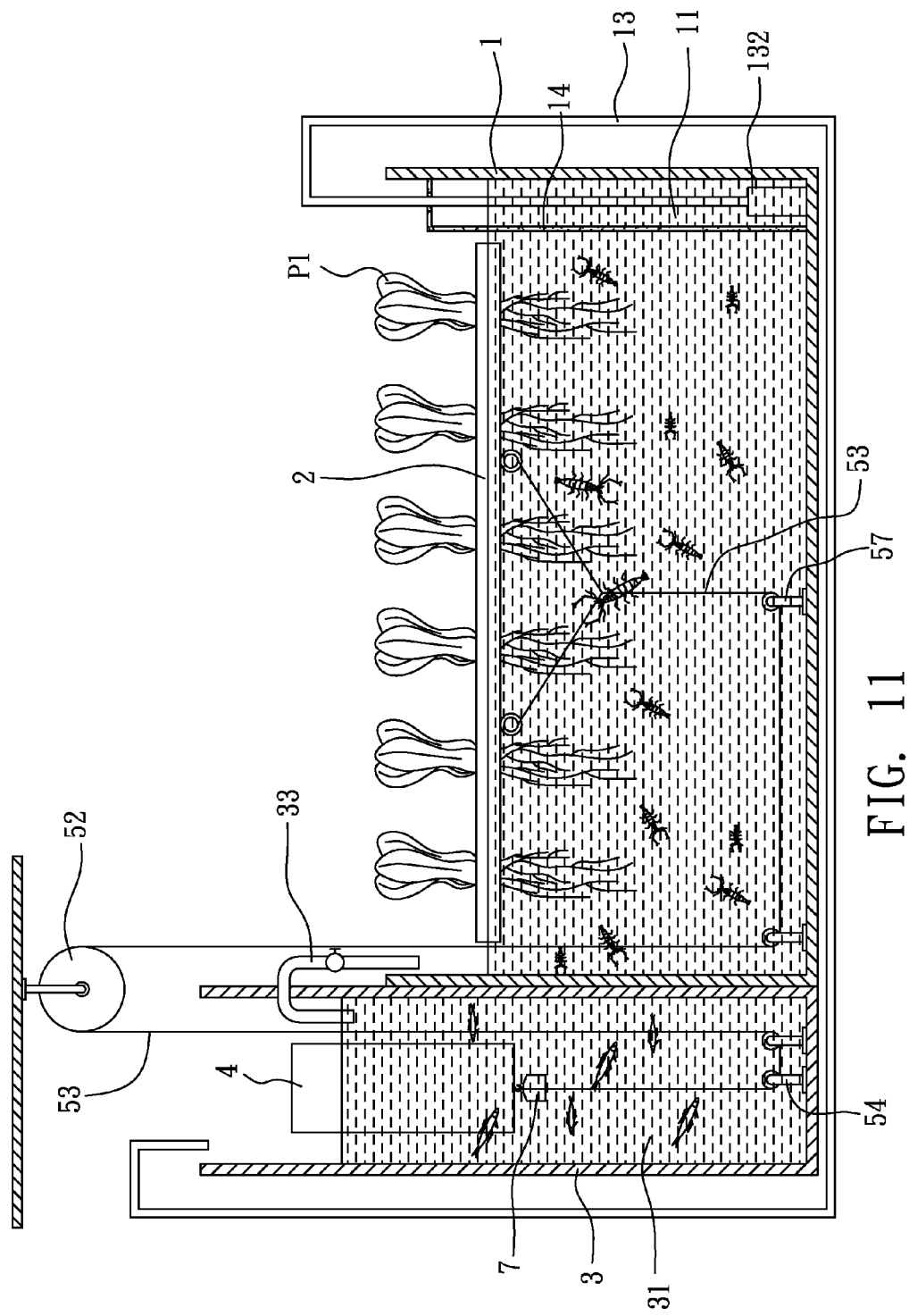
FIG. 11 is a schematic view illustrating a first alternate form of the hydroponic system in accordance with the third embodiment of the present invention.
Figure 12A:
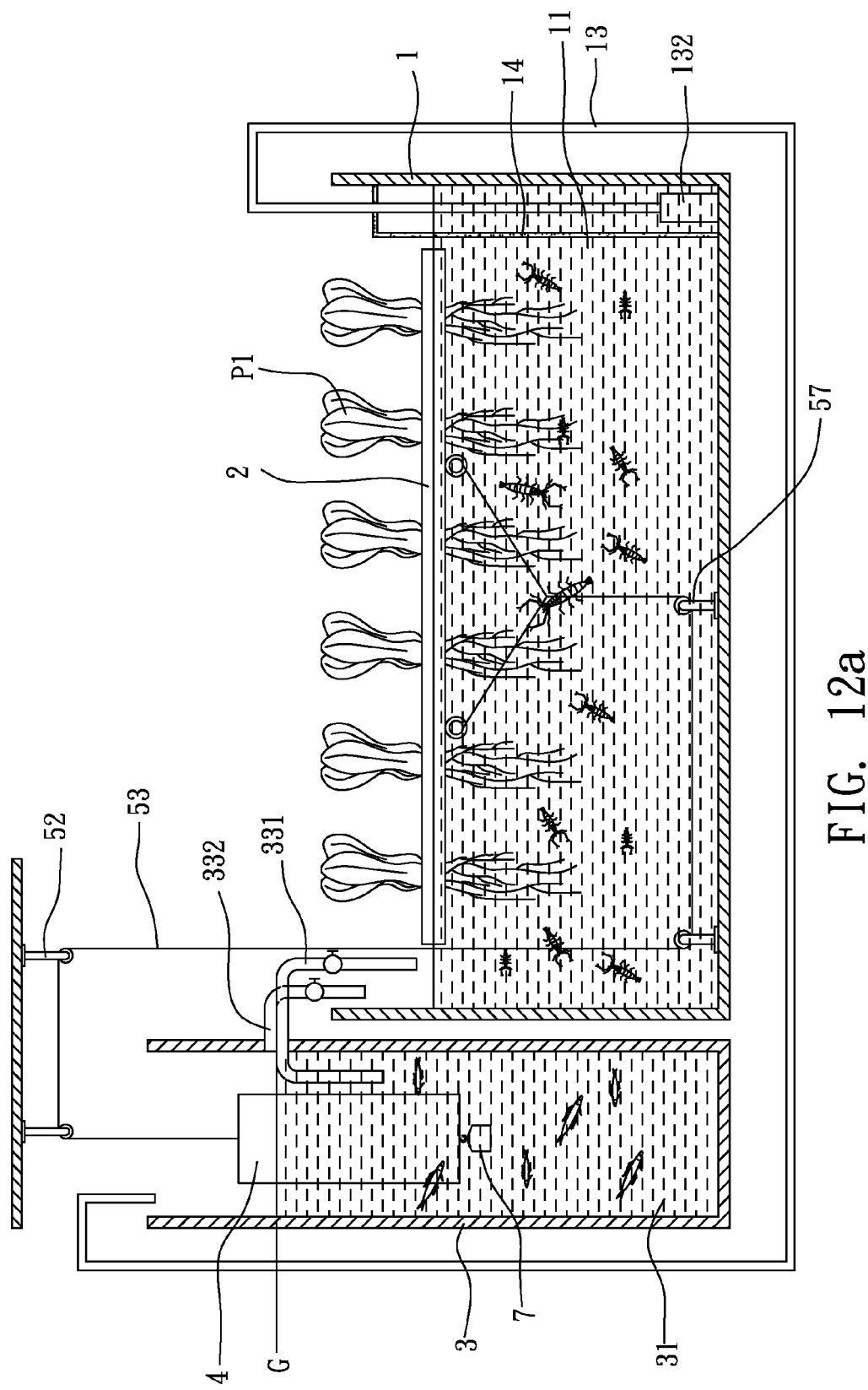
FIG. 12a is a schematic view illustrating a second alternate form of the hydroponic system in accordance with the third embodiment of the present invention.
Figure 12B:
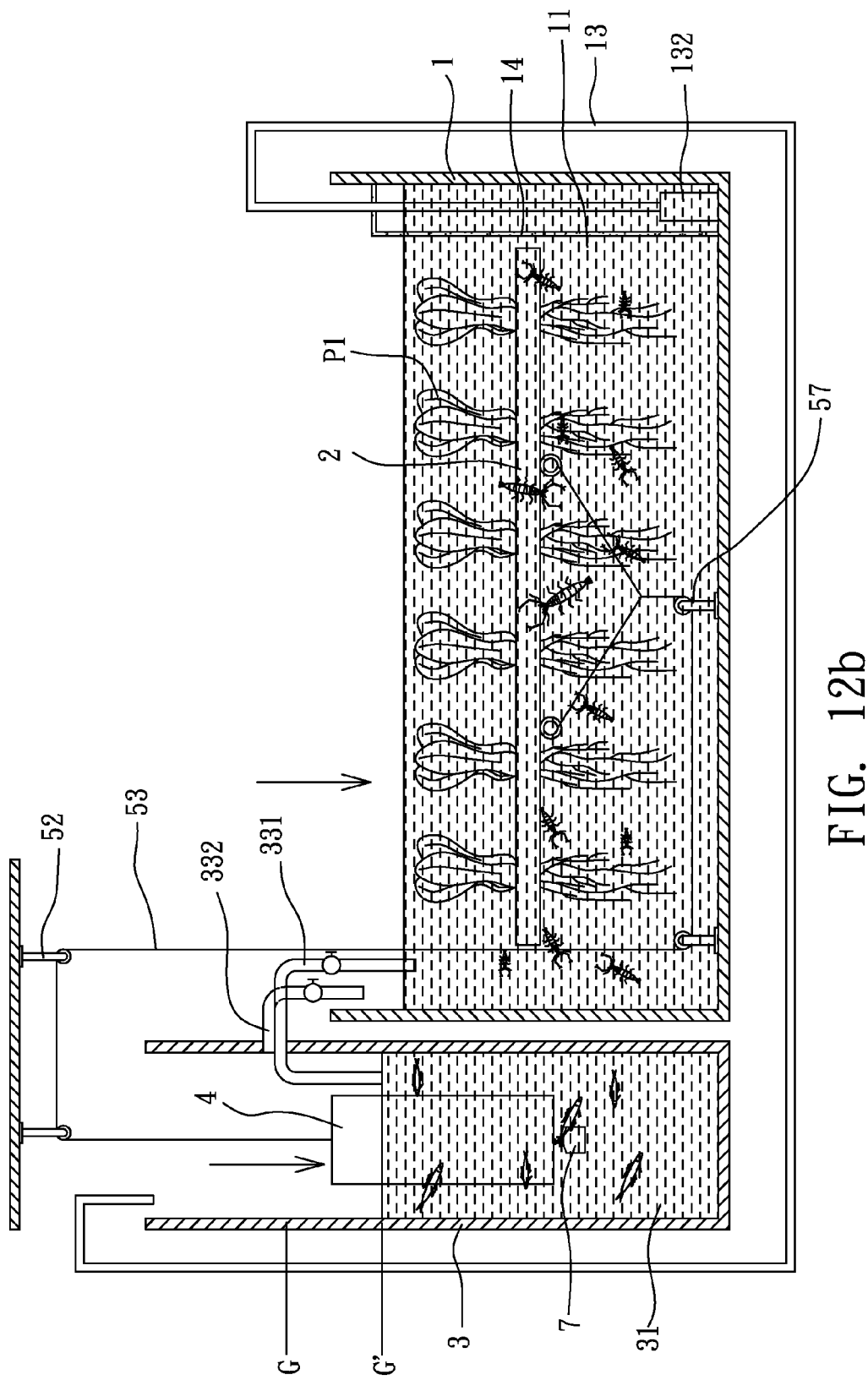
FIG. 12b is another schematic view illustrating a second alternate form of the hydroponic system in accordance with the third embodiment of the present invention which illustrates the carrier being dipped in the nutrient solution.
Figure 13A:
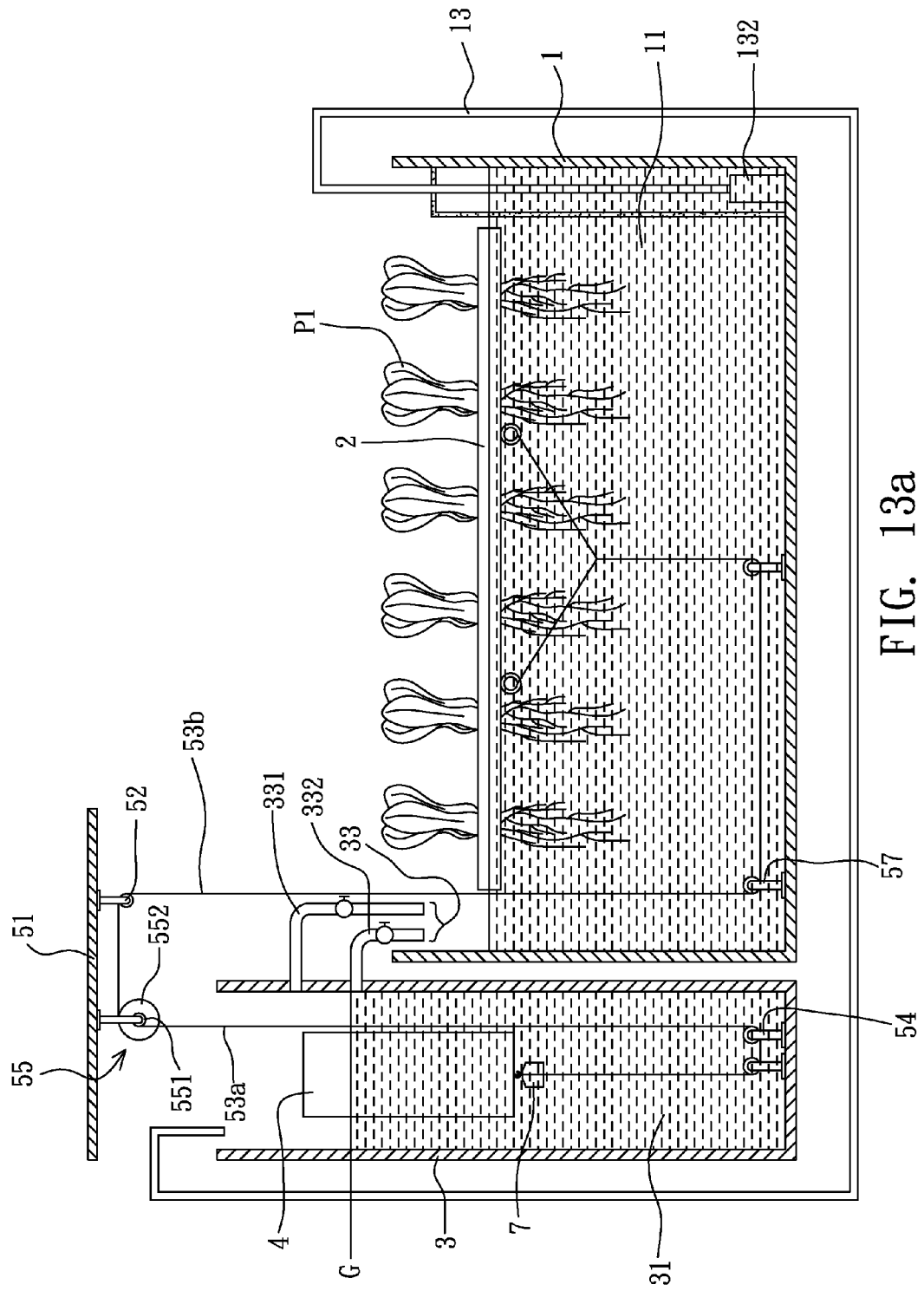
FIG. 13a is a schematic view illustrating a fourth embodiment of the hydroponic system provided by the present invention.
Figure 13B:
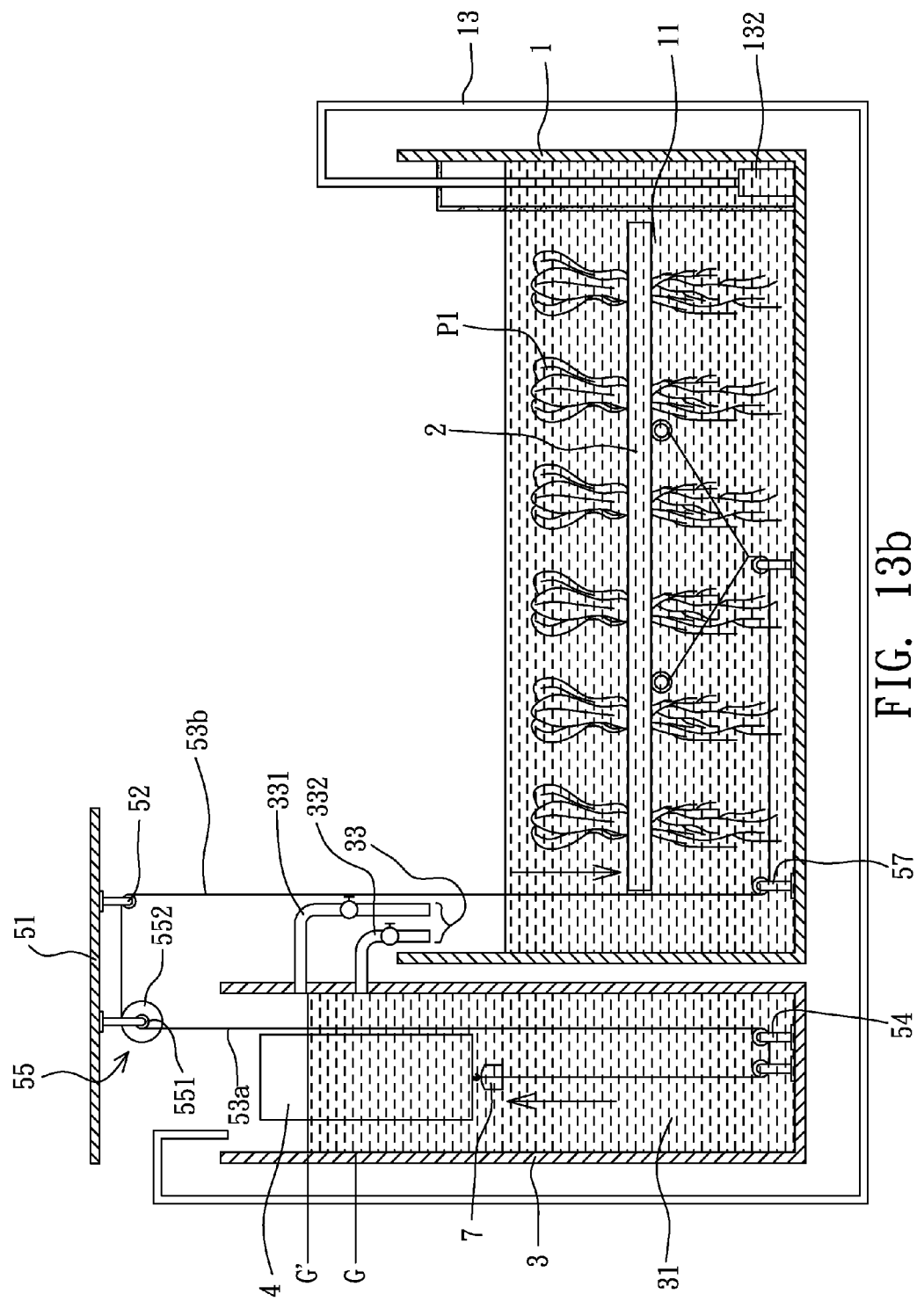
FIG. 13b is another schematic view illustrating a fourth embodiment of the hydroponic system provided by the present invention which illustrates the carrier being dipped in the nutrient solution.
Figure 14:
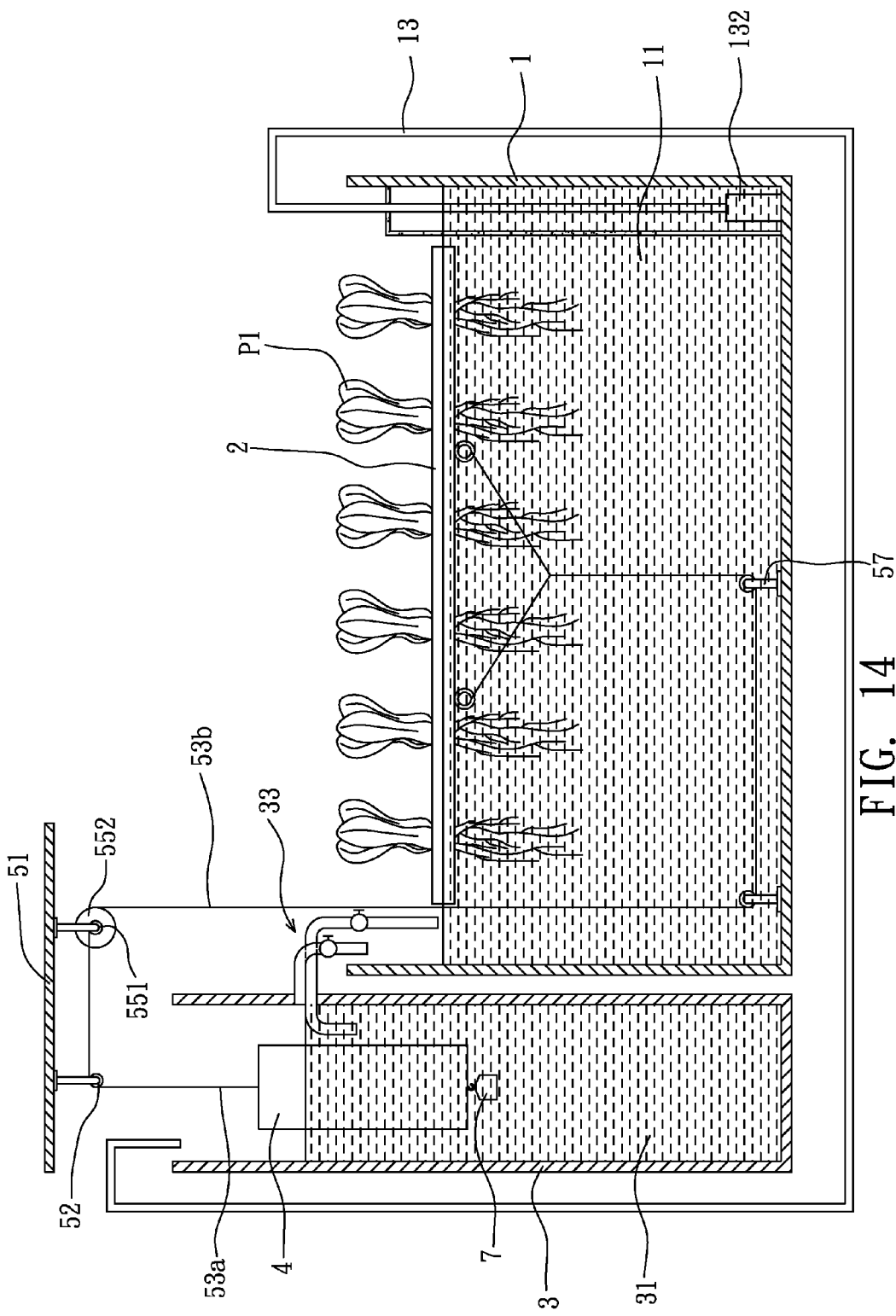
FIG. 14 is a schematic view illustrating a first alternate form of the hydroponic system in accordance with the fourth embodiment of the present invention.

The accompanying drawings are included to provide a further understanding of the invention, and are incorporated in and constitute a part of this specification. The drawings illustrate embodiments of the invention and, together with the description, serve to explain the principles of the invention, wherein FIG. 1 is a schematic view showing a first embodiment of the hydroponic system provided by the present invention; FIG. 2a is a schematic view showing the carrier being dipped in the nutrient solution in accordance with the first embodiment of the present invention; FIG. 2b is a schematic view showing the roots of the plants being exposed to the outside air in accordance with the first embodiment of the present invention; FIG. 3 is a schematic view showing a first alternate form of the hydroponic system in accordance with the first embodiment of the present invention; FIG. 4a is a schematic view showing the carrier being dipped in the nutrient solution, in accordance with the alternate embodiment shown in FIG. 3; FIG. 4b is a schematic view showing the roots of the plants being exposed to the outside air in accordance with the alternate embodiment shown in FIG. 3; FIG. 5 is a schematic view showing a second embodiment of the hydroponic system provided by the present invention; FIG. 6 is a schematic perspective showing the second embodiment of the hydroponic system provided by the present invention; FIG. 7a is a schematic view showing the carrier being dipped in the nutrient solution in accordance with the second embodiment of the present invention; FIG. 7b is a schematic view showing the roots of the plants being exposed to the outside air in accordance with the second embodiment of the present invention; FIG. 8 is a schematic view showing a first alternate form of the hydroponic system in accordance with the second embodiment of the present invention; FIG. 9 is a schematic view showing a second alternate form of the hydroponic system in accordance with the second embodiment of the present invention; FIG. 10a is a schematic view in accordance with the third embodiment of the present invention; FIG. 10b is a schematic view showing the carrier being dipped in the nutrient solution in accordance with the third embodiment of the present invention; FIG. 11 is a schematic view showing a first alternate form of the hydroponic system in accordance with the third embodiment of the present invention; FIG. 12a is a schematic view showing a second alternate form of the hydroponic system in accordance with the third embodiment of the present invention. FIG. 12b is another schematic view showing a second alternate form of the hydroponic system in accordance with the third embodiment of the present invention which illustrates the carrier being dipped in the nutrient solution; FIG. 13a is a schematic view showing a fourth embodiment of the hydroponic system provided by the present invention; FIG. 13b is another schematic view showing a fourth embodiment of the hydroponic system provided by the present invention which illustrates the carrier being dipped in the nutrient solution; and FIG. 14 is a schematic view showing a first alternate form of the hydroponic system in accordance with the fourth embodiment of the present invention.

Referring from FIG. 1 to FIG. 2b, a hydroponic system in accordance with a first embodiment of the present invention substantially comprises at least one hydroponic tank 1, and at least one level adjustment tank 3, wherein each hydroponic tank 1 and level adjustment tank 3 are respectively provided with at least a carrier 2 and at least a float 4, and a linkage mechanism 5 is connected between the carrier 2 and the float 4 for forming a linkage state.

The hydroponic tank 1 is a box-liked vessel for holding a nutrient solution 11 that provides the necessary nutrients for plants P1 carried or grown on the at least one carrier 2, wherein the nutrient solution 11 in the hydroponic tank 1 is used for farming different aquatic species, such as, shrimps, fishes, crabs, shellfishes, etc.

The carrier 2 is adopted for carrying plants or growing plants P1, and the carrier 2 and the plants P1 thereof have an average specific gravity greater than the specific gravity of the nutrient solution 11. Therefore, the carrier 2 can be dipped with the plants P1 in the nutrient solution 11. As shown in FIG. 1, the carrier 2 is an elongated flat plate member, which can be dipped in the nutrient solution 11, thus the plants P1 to be grown can be selected from plants suitable for water dipping, such as lettuce, water convolvulus, spinach . . . , and etc.

The level adjustment tank 3 is a box-like vessel, and the area of the fluid level thereof is much smaller than that of the hydroponic tank 1, but the height of the fluid level thereof can be higher than that of the hydroponic tank 1. The level adjustment tank 3 is provided with an adjustment solution 31, e.g. but not limited to fresh water. The adjustment solution can also adopted the mentioned nutrient solution or other liquids, for allowing the at least one float 4 to be float on the fluid level of the adjustment solution. Moreover, for adjusting the level of the adjustment solution 31 in the level adjustment tank 3, at least a first water intake pipe 32 and at least one first discharge pipe 33 are respectively installed on the level adjustment tank 3. The at least one first discharge pipe 33 includes at least a dipping level discharge pipe 331 and at least a balance level discharge pipe 332, and the dipping level and the balance level discharge pipes are spaced with a preset interval.

The first water intake pipe 32 and the at least one first discharge pipe 33 can be respectively installed with a control valve 61, wherein each control valve 61 is connected to an automatic control system 6, such that each control valve 61 can be opened or closed through being controlled by the automatic control system 6 with a wired or wireless manner, so as to control the operations of water filling or discharging to the level adjustment tank 3; the automatic control technique is a conventional arts therefore no further illustration is provided.

The float 4 is a solid-state member, and has a specific gravity smaller than that of the adjustment solution 31, thus the float 4 can constantly float on the fluid level of the adjustment solution 31. As shown in FIG. 1, the float 4 is in, e.g. but not limited to, a cylindrical shape, what shall be addressed is that any geometric-shaped float member can be adopted in the present invention. As shown in FIG. 1, the quantity of the float 4 is, e.g. but not limited to, one; in actual practice, the float 4 can also be composed of plural forms or plural small float members.

As what is disclosed above, the specific gravity of the float 4 is smaller than that of the adjustment solution 31 in the level adjustment tank 3, so as to constantly float on the fluid level of the adjustment solution 31; and the average specific gravity of the carrier 2 and the plants P1 thereof is greater than the specific gravity of the nutrient solution 11 in the hydroponic tank 1, so as to dip in the nutrient solution 11; wherein the gross weight of the float 4 is greater than the gross weight of the carrier 2 and the plants P1 thereof subtracting the total buoyancy of the carrier 2 totally immersed in the nutrient solution 11, such that the float 4 can constantly float on the fluid level of the adjustment solution 31, and the carrier 2 is prevented from dipping in the nutrient solution 11. When the gross weight of the float 4 is greater than that of the carrier 2 and the plants P1 thereof, the roots of the plants P1 are partially exposed to the outside air, and the float 4 is not dragged by the carrier 2, thereby preventing the float 4 from separating from the fluid level of the adjustment solution 31. In addition, for adjusting the specific gravity of the float 4 and the carrier 2, at least a weight 7 can be optionally combined on the float 4 or the carrier 2.

The linkage mechanism 5 is connected to the float 4 and the carrier 2, so when the height of the float 4 is altered with the elevation of the level in the level adjustment tank 3, the carrier 2 generates a relative lifting/sinking effect in the nutrient solution 11 of the hydroponic tank 1. As shown in FIG. 1, at least a support member 51 is horizontally installed above the hydroponic tank 1 and the level adjustment tank 3, wherein the support member 51 can be a transversally-disposed platform or rod member or column member. The support member 51 is installed with at least an upper guide member 52 corresponding to the locations of each float 4 and carrier 2. The upper guide member 52 can be a guide pulley or fixed ring. As shown in FIG. 1, two upper guide members 52 are provided; if the dimension of upper guide member 52 is relatively and sufficiently large, only one upper guide member 52 is required. The upper guide member 52 allows a drag rope 53 to be installed thereon, and two ends of the drag rope 53 are respectively connected to the carrier 2 and the float 4.

Referring to FIG. 1, the natural weight of the float 4 offsets the sinking force of the carrier 2 and the plants P1 thereof, such that the carrier 2 can be located on the fluid level of the nutrient solution 11, and the roots of the plants P1 can be dipped in the nutrient solution 11 for absorbing the nutrients required for growth.

Referring to FIG. 2a, when wishing to dip the carrier 2 and the plants P1 thereof in the nutrient solution 11 for allowing the stems and leaves of each plant P1 to absorb nutrients, at this moment, the control valve 61 of the balance level discharge pipe 332 is in a closed state, and a user can open the control valve 61 of the first water intake pipe 32 through the automatic control system 6 for filling the adjustment solution 31 in the level adjustment tank 3, such that the original fluid level G shown in FIG. 1 is raised to the current fluid level G' shown in FIG. 2a. At this moment, the float 4 is upwardly lifted a certain distance (G'–G), for example 25 cm, and the carrier 2 downwardly pulls the drag rope 53 with the same distance, thereby dipping in the nutrient solution 11, and the roots, stems and leaves of each plant P1 can synchronously absorb the nutrients required for growth, and pests adhering on the stems and leaves can be drowned or evicted during the dipping process, thereby eliminating the pests.

Because the summed area of the fluid level of the level adjustment tank 3 is much smaller than that of the hydroponic tank 1, when wishing to respectively filling water into the level adjustment tank 3 and the hydroponic tank 1 for reaching the same height, the water amount required by the level adjustment tank 3 can be significantly reduced and the operation time of a water pump can also be shortened; thus comparing to conventional arts, the present invention is further equipped with effects of saving power and reducing carbon consumption.

Referring to FIG. 2b, when wishing to release the carrier 2 and the plants P1 thereof from dipping after a certain period of time in dipping, the balance level discharge pipe 332 is actuated for discharging and the fluid level of the adjustment solution 31 in the level adjustment tank 3 is gradually lowered till reaching a water outlet fluid level G" of the balance level discharge pipe 332, and the float 4 is lowered from the original fluid level G to a fluid level of G", for example 3 cm, thereby pulling the drag rope 53 to link the carrier 2 to raise, and the roots of the plants P1 are partially exposed to the outside air for increasing the amount of aeration of the plants P1.

Referring to FIG. 3, which is a first alternate form of the hydroponic system in accordance with the first embodiment of the present invention. According to this alternate form, the hydroponic tank 1 is installed with at least a second discharge pipe 13 having a water pump 131 installed at its pipeline for serving as a water intake pipe of the level adjustment tank 3. As such, the adjustment solution 31 in the level adjustment tank 3 is the nutrient solution, so both of the tanks 1, 3 can be used for farming different aquatic species, such as, shrimps, fishes, crabs, shellfishes, etc.

For preventing unwanted matter, e.g. roots or leaves fallen from the plants P1, from clogging the second discharge pipe 13, a filter 14, e.g. a net gauze, is installed in the upstream of the second discharge pipe 13, wherein the filter 14 is of the known art therefore no further illustration is provided.

Moreover, the bottom of the level adjustment tank 3 is installed with at least one turning guide member 54. The at least one turning guide can include one turning guide member or two turning guide members. As shown in FIG. 3, two turning guide members can be provided, if the dimension of the at least one turning guide member 54 is relatively and sufficiently large, only one turning guide member is required. The drag rope 53 passing the upper guide member 52 passes through the at least one turning guide member 54, e.g. a guide pulley or fixed ring, in the level adjustment tank 3, then is connected to the float 4. Thus, according to this alternate form, the relative relation of the carrier 2 and the plants P1 thereof and the float 4 is that the specific gravity of each float 4 is smaller than that of the adjustment solution 31, and the average specific gravity of each carrier 2 and the plants P1 thereof is greater than the specific gravity of the nutrient solution 11, the total buoyancy of the float 4 totally immersed in the adjustment solution 31 subtracting the gross weight of the float 4 is greater than the gross weight of the carrier 2 and the plants P1 thereof subtracting the total buoyancy of the carrier 2 totally immersed in the nutrient solution 11; at this moment, the float 4 is dragged by the carrier 2 and the plants P1 thereof but not to the extent of dipping in the adjustment solution 31. When the total buoyancy of the float 4 totally immersed in the adjustment solution 31 subtracting the gross weight of the float 4 is greater than the gross weight of the carrier 2 and the plants P1 thereof, the roots of the plants P1 are partially exposed to the outside air, and the float 4 is dragged by the carrier 2 but not to the extent of totally dipping in the adjustment solution 31. Accordingly, the float 4 and the carrier 2 can be synchronously lifted or lowered respectively in the level adjustment tank 3 and the hydroponic tank 1.

In addition, the at least one first discharge pipe 33 of the level adjustment tank 3, for example, can include an exposing level discharge pipe 333, the balance level discharge pipe 332 and the dipping level discharge pipe 331 arranged with a preset interval, and each of the mentioned discharge pipes are all served as water intake pipes of the hydroponic tank 1.

Referring to FIG. 3, the level of the level adjustment tank 3 is equal to the height of the balance level pipe 332, at this moment, the buoyancy of the float 4 offsets the sinking force of the carrier 2 and the plants P1 thereof, such that the carrier 2 is located on the fluid level of the nutrient solution 11, and the roots of the plants P1 are dipped in the nutrient solution 11 for absorbing the nutrients required for growth.

Referring to FIG. 4a, when wishing to dip the carrier 2 and the plants P1 thereof in the nutrient solution 11, the control valve 61 of the dipping level discharge pipe 331 is opened for allowing the hydroponic tank 1 to be filled with the nutrient solution 11, such that the original fluid level G shown in FIG. 3 is lowered to the current fluid level G' shown in FIG. 4a; at this moment, the float 4 is downwardly displaced a certain distance (G'−G), for example 25 cm, and the carrier 2 downwardly pulls the drag rope 53 with the same distance, thereby dipping in the nutrient solution 11, so the roots, stems and leaves of each plant P1 can synchronously absorb the nutrients required for growth, and pests can be drowned or evicted.

Referring to FIG. 4b, when wishing to release the carriers 2 and the plants P1 thereof from dipping after a certain period of time in dipping, the water pump 131 of the second discharge pipe 13 is actuated for discharging, and the pumped-out nutrient solution 11 is conveyed to the level adjustment tank 3, because the area of the fluid level of the hydroponic tank 1 and that of the level adjustment tank 3 are distinctly different, so the fluid level of the hydroponic tank 1 being slightly lowered would cause the fluid level of the level adjustment tank 3 to be greatly raised to the water outlet fluid level G" of the exposing level discharge pipe 333, such that the float 4 is lifted from the original fluid level G to a fluid level of G", for example 3 cm, thereby pulling the drag rope 53 to link the carrier 2 to raise, and the roots of the plants P1 are partially exposed to the outside air for increasing the amount of aeration of the plants P1.

Referring to FIG. 5, which is a second embodiment of the hydroponic system provided by the present invention. According to this embodiment, the at least one support member 51 is installed with at least an upper guide member 52, e.g. a guide pulley or fixed ring, and at least one take-up mechanism 55 corresponding to the locations of the carrier 2 and the float 4.

As shown in FIG. 6, in order to provide a clear view of the at least one take-up mechanism 55, plants carried or grown on the carrier are not shown. The at least one take-up mechanism can include two take-up mechanisms that are coaxially sleeved by a pivot shaft 56 and spaced with an interval, the mentioned arrangement of take-up mechanisms is served as an example and shall not be a limitation to the scope of the present invention, each at least one take-up mechanism 55 can also be individually installed on the support member 51 with the pivotal connection means adopted in the upper guide member 52.

Each at least one take-up mechanism 55 includes a small reel 551 and at least a large reel 552. In actual practice, the small and large reels 551, 552 can be, but not limited to, pulleys, and the circumference ratio between the small and the large reels 551, 552, is 1:≥1. As shown in FIG. 5 and FIG. 6, the circumference ratio between the small and the large reels 551, 552, is 1:3, and free ends of a first drag rope 53a and a second drag rope 53b wound around the small and the large reels 551, 552 are respectively connected to the float 4 and the carrier 2. According to this embodiment, the average specific gravity of the carrier 2 and the plants P1 thereof is greater than the specific gravity of the nutrient solution 11, and the specific gravity of the float 4 is smaller than that of the adjustment solution 31. For preventing the float 4 from being dragged by the carrier 2 for moving, the gross weight of the float 4 is greater than the gross weight of the carrier 2 and the plants P1 thereof subtracting the total buoyancy of the carrier 2 totally immersed in the nutrient solution 11 then multiplying the circumference ratio between the larger and the small reels.

The at least one first discharge pipe 33 of the level adjustment tank 3 is served as a water intake pipe of the hydroponic tank 1, and the second discharge pipe 13 of the hydroponic tank 1 is connected to a sinking type water pump 132 at one end of the hydroponic tank 1, and the other end is served as the water intake pipe of the level adjustment tank 3, thereby forming a circulative system between the hydroponic tank 1 and the level adjustment tank 3. Wherein, one side of the hydroponic tank 1 is installed with two level adjustment tanks 3 which are communicated by at least a communication pipe 34 and a discharge pipe 35. The discharge pipe 35 is disposed at the bottoms of the two level adjustment tanks 3 for discharging depositions.

As shown in FIG. 5, the level of the level adjustment tank 3 is equal to the height of the balance level discharge pipe 332, at this moment, the natural weight of the float 4 offsets the sinking force of the carrier 2 and the plants P1 thereof, such that the carrier 2 is located on the fluid level of the nutrient solution 11, and the roots of the plants P1 are dipped in the nutrient solution 11 for absorbing the nutrients required for growth.

Referring to FIG. 7a, when a user actuates the sinking type water pump 132 of the second discharge pipe 13 for discharging, and the pumped-out nutrient solution 11 is conveyed to the level adjustment tank 3, because the area of the fluid level of the hydroponic tank 1 and that of the level adjustment tank 3 are distinctly different, so the fluid level of the hydroponic tank 1 being slightly lowered would cause the fluid level of the level adjustment tank 3 to be raised from the original fluid level G to the current fluid level G', and the float 4 is raised by a certain distance (G'–G), for example 8 cm, at this moment, the float 4 is upwardly lifted 8 cm, and the small reel 551 winds the first drag rope 53*a* with the same distance, so the large reel 552 rotates through the same angle and releases the second drag rope 53*b* with a length three-time greater than the distance (24 cm, if the circumference ratio between the small and the large reels is 1:3), so the carrier 2 and the plants P1 thereof are dipped in the nutrient solution 11.

As shown in FIG. 7*b*, when wishing to release the carriers 2 and the plants P1 thereof from dipping after a certain period of time in dipping, the at least one first discharge pipe 33 is actuated for discharging, such that the water level is gradually lowered to the water outlet height of the at least one discharge pipe 33, and the float 4 floats on the current fluid level G" and is lowered, for example, 9 cm (G'–G"), thereby downwardly pulling the first drag rope 53*a* and rotating the small reel 551, so the carrier 2 is raised 27 cm through the second drag rope 53*b* being wound by the large reel 552, and the roots of the plants P1 are partially exposed to the outside air to increase the amount of aeration of the growing plants P1.

As shown in FIG. 8, which is a first alternate form of the hydroponic system in accordance with the second embodiment of the present invention. According to this alternate form, the first drag rope 53*a* passes through the at least one turning guide member 54 disclosed in the first embodiment, and is connected to the float 4. Thus, according to this alternate form, the relative relation of the carrier 2 and the plants P1 thereof and the float 4 is that the specific gravity of each float 4 is smaller than that of the adjustment solution 31, and the average specific gravity of each carrier 2 and the plants P1 thereof is greater than the specific gravity of the nutrient solution 11, the total buoyancy of the float 4 totally immersed in the adjustment solution 31 subtracting the gross weight of the float 4 is greater than the gross weight of the carrier 2 and the plants P1 thereof subtracting the total buoyancy of the carrier 2 totally immersed in the nutrient solution 11 then multiplying the circumference ratio between the large and the small reels. Accordingly, the float 4 and the carrier 2 can be synchronously lifted or lowered respectively in the level adjustment tank 3 and the hydroponic tank 1.

The carrier 2 utilizes two second drag ropes 53*b* to respectively pass around an upper guide member 52 fastened on at least one support member 51, then are individually wound around a large reel 552, the mentioned connection means allowing the carrier 2 and the plants P1 thereof to have the lifting/sinking effect in the nutrient solution is the same what have been achieved by the first embodiment as illustrated through the FIG. 3, FIG. 4*a* and FIG. 4*b*, therefore no further disclosure is provided.

In addition, the arrangement means of the exposing level discharge pipe 333, the balance level discharge pipe 332 and the dipping level discharge pipe 331 of the level adjustment tank 3 is the same of the arrangement means disclosed in FIG. 3, therefore no further illustration is provided. Moreover, the second embodiment and the alternate form thereof can also be applied to a situation where two ends of a level adjustment tank being respectively installed with a hydroponic tank as shown in FIG. 5.

As shown in FIG. 9, which is a second alternate form of the hydroponic system in accordance with the second embodiment of the present invention. In order to provide a clear view of the at least one take-up mechanism 55, plants carried or grown on each carrier 2 are not shown. According to this alternate form, the hydroponic tank 1 is provided with three carriers 2, and the level adjustment tanks 3 at one lateral side of the hydroponic tank 1 are arranged and connected with a stepped-like means, wherein the level adjustment tank 3 in the upmost stream is installed with a first water intake pipe 32, and at least one first discharge pipe 33 disposed in each level adjustment tank 3 and arranged with an upper/lower level manner are served as water intake pipes for the adjacent level adjustment tank 3. At least one first drag rope 53*a* connected to the float 4 in each level adjustment tanks 3 is wound on each small reel 551 sleeved by a pivot shaft 56 and oppositely disposed, and at least one second drag rope 53*b* connected to the carrier 2 in each hydroponic tank 1 is wound on each larger reel 552 sleeved therewith and oppositely disposed. The dipping and release of the carriers 2 and the plants P1 thereof are the same as what has been disclosed in the second embodiment, therefore no further illustration is provided.

As shown in FIG. 10*a*, which is a third embodiment of the hydroponic system provided by the present invention. According to this embodiment, the bottom of the hydroponic tank 1 is installed with at least a lower guide member 57, e.g. a guide pulley or fixed ring. FIG. 10*a* shows two lower guide members 57 being installed; however, single lower guide member 57 can also be adopted, as long as the drag rope 53 passes over the carrier 2. Wherein, one end of the drag rope 53 is connected to the float 4, the other end thereof passes through the at least one turning guide member 54, the upper guide member 52 and the lower guide member 57, then is connected to the carrier 2.

The level adjustment tank 3 is respectively installed with at least one first water intake pipe 32 and at least one first discharge pipe 33. The first discharge pipe 33 can include at least a dipping level discharge pipe 331 and at least a balance level discharge pipe 332. The hydroponic tank 1 can be respectively installed with at least a second water intake pipe 12 and at least a second discharge pipe 13 according to actual needs.

The technical characteristic of this embodiment is that, the specific gravity of the float 4 and the average specific gravity of the carrier 2 and the plants P1 thereof are respectively smaller than that of the adjustment solution 31 in the level adjustment tank 3 and that of the nutrient solution 11 in the hydroponic tank 1, and the total buoyancy of the float 4 totally immersed in the adjustment solution 31 subtracting the gross weight of the float 4 is greater than the total buoyancy of the carrier 2 and the plants P1 thereof totally immersed in the nutrient solution 11 subtracting the gross weight of the carrier 2 and the plants P1 thereof. As such, the float 4 can constantly float of the fluid level of the adjustment solution 31, and the carrier 2 is dragged by the drag rope 53 of the float 4 to float on or dip in the nutrient solution 11.

Referring to FIG. 10*a*, the float 4 and the carrier 2 are respectively located on the adjustment solution 31 in the level adjustment tank 3 and the nutrient solution 11 in the hydroponic tank 1, and the carrier 2 and the roots of the plants P1 thereof are dipped in the nutrient solution 11 for absorbing the nutrients required for growth.

Referring to FIG. 10*b*, when wishing to dipping the carrier 2 and the plants P1 thereof in the nutrient solution 11 for allowing the stems and leaves of the plants to absorb nutrients, at this moment, the user only needs to utilize the first water intake pipe 32 to fill the adjustment solution 31 into the level adjustment tank 3, such that the fluid level is raised to the current fluid level G' shown in FIG. 10b from the original fluid level G shown in FIG. 12a. At this moment, the float 4 is upwardly lifted a distance (G'–G), for example 25 cm, and pulls the drag rope 53 with the same distance, so the carrier 2 is dipped in the nutrient solution 11 to allow the roots, stems and leaves of each plant P1 to synchronously absorb the nutrients required for growth, and pests adhering on the stems and leaves can be drowned or evicted during the dipping process, thereby eliminating the pests.

Because the total area of the fluid level of the level adjustment tank 3 is much smaller than that of the hydroponic tank 1, when wishing to respectively filling water into the level adjustment tank 3 and the hydroponic tank 1 for reaching the same height, the water amount required by the level adjustment tank 3 is significantly reduced and the operation time of the water pump can also be shortened; thus comparing to conventional arts, the present invention is further equipped with effects of saving power and reducing carbon consumption.

When wishing to release the carriers 2 and the plants P1 thereof from dipping after a certain period of time in dipping, the balance level discharge pipe 332 is actuated for discharging, and the fluid level of the adjustment solution 31 in the level adjustment tank 3 is gradually lowered till reaching the water outlet height of the balance level discharge pipe 332 as shown in FIG. 10a, the float 4 releases a certain length of the drag rope 53, so the linked carrier 2 is lifted and floats on the fluid level of the nutrient solution 11.

As shown in FIG. 11, which is a first alternate form of the hydroponic system in accordance with the third embodiment of the present invention. According to this alternate form, the hydroponic tank 1 is installed with at least one second discharge pipe 13, one end of the discharge pipe 13 is installed with a sinking type water pump 132 in the hydroponic tank 1 for serving as a water intake pipe of the level adjustment tank 3, and the at least one first discharge pipe 33, e.g. a siphon pipe, of the level adjustment tank 3 is served as a water intake pipe of the hydroponic tank 1. As such, the adjustment solution 31 in the level adjustment tank 3 can be nutrient solution, so both of the two tanks 1, 3 can be used for farming different aquatic species, such as, shrimps, fishes, crabs, shellfishes, etc. The dipping and release of the carriers 2 and the plants P1 thereof are the same as what has been disclosed in the third embodiment, therefore no further illustration is provided.

As shown in FIG. 12a, which is a second alternate form of the hydroponic system in accordance with the third embodiment of the present invention. According to this alternate form, the level adjustment tank 3 is not provided with the turning guide member. Thus, according to this alternate form, the relative relation of the carrier 2 and the plants P1 thereof and the float 4 is that the specific gravity of each float 4 and the average specific gravity of the carrier 2 and the plants P1 thereof are respectively smaller than that of the adjustment solution 31 and that of the nutrient solution 11, the gross weight of the float 4 is greater than the total buoyancy of the carrier 2 and the plants P1 thereof totally immersed in the nutrient solution 11 subtracting the gross weight of the carrier 2 and the plants P1 thereof. Moreover, the float 4 is directly connected to one end of the drag rope 53, and the other end passes around the upper guide member 52 and the lower guide member 57, then is connected to the carrier 2.

Referring to FIG. 12a, the fluid level in the level adjustment tank 3 is equal to the height of the balance level discharge pipe 332, and the float 4 and the carrier 2 and the plants P1 thereof are in a balanced state, such that the float 4 and the carrier 2 are respectively located on the fluid level of the adjustment solution 31 (nutrient solution) in the level adjustment tank 3 and the nutrient solution 11 in the hydroponic tank 1, and the roots of the plants P1 are dipped in the nutrient solution 11 for absorbing the nutrients required for growth.

Referring to FIG. 12b, when wishing to dipping the carrier 2 and the plants P1 thereof in the nutrient solution 11, the dipping level discharge pipe 331 is opened for filling the nutrient solution 11 into the hydroponic tank 1, such that the fluid level is lowered to the current fluid level G' shown in FIG. 12b from the original fluid level G shown in FIG. 12a. At this moment, the float 4 is downwardly displaced a distance (G'–G), for example 25 cm, and pulls the drag rope 53 with the same distance, so the carrier 2 is dipped in the nutrient solution 11 to allow the roots, stems and leaves of each plant P1 to synchronously absorb the nutrients required for growth, and pests can be drowned or evicted.

When wishing to release the carriers 2 and the plants P1 thereof from dipping after a certain period of time in dipping, the sinking type water pump 132 of the second discharge pipe 13 is actuated for discharging, and the pumped-out nutrient solution 11 is conveyed to the level adjustment tank 3, because the area of the fluid level of the hydroponic tank 1 and the level adjustment tank 3 are distinctly different, so the fluid level of the hydroponic tank 1 being slightly lowered would cause the fluid level of the level adjustment tank 3 to be greatly raised to the water outlet height of the balance level discharge pipe 332, and the float 4 releases a certain length of the drag rope 53, and the linked carrier 2 is lifted to float on the fluid level of the nutrient solution 11.

As shown in FIG. 13a, which is a fourth embodiment of the hydroponic system provided by the present invention. According to this embodiment, the linkage mechanism 5 is installed with at least one take-up mechanism 55 on at least one support member 51 corresponding to the lower guide member 57 of the carrier 2 and the at least one turning guide member 54 of the float 4, or a lateral side of the at least one take-up mechanism 55 is additionally provided with at least an upper guide member 52.

Each at least one take-up mechanism 55 includes a small reel 551 and at least a large reel 552, and the circumference ratio between the small and the large reels 551, 552, is 1:≥1. As shown in FIG. 13a, the circumference ratio between the small and the large reels 551, 552, is 1:3, and free ends of the first drag rope 53a and the second drag rope 53b wound on the small and the large reels 551, 552 are respectively connected to the float 4 and the carrier 2.

The technical characteristic of this embodiment is that, the specific gravity of the float 4 and the average specific gravity of the carrier 2 and the plants P1 thereof are respectively smaller than that of the adjustment solution 31 and that of the nutrient solution 11, and the total buoyancy of the float 4 totally immersed in the adjustment solution 31 subtracting the gross weight of the float 4 is greater than the total buoyancy of the carrier 2 and the plants P1 thereof totally immersed in the nutrient solution 11 subtracting the gross weight of the carrier 2 and the plants P1 thereof then multiplying the circumference ratio between the larger and small reels. As such, the float 4 is prevented from being dragged by the carrier 2 for moving, and the float 4 can constantly float of the fluid level of the adjustment solution 31, and the carrier 2 is dragged by the float 4 to float on or dip in the nutrient solution 11.

Referring to FIG. 13a, the at least one first discharge pipe 33 of the level adjustment tank 3 is served as a water intake pipe of the hydroponic tank 1, and the second discharge pipe 13 of the hydroponic tank 1 is connected to a sinking type water pump 132 at one end of the hydroponic tank 1, and the other end is served as the water intake pipe of the level adjustment tank 3, thereby forming a circulative system between the hydroponic tank 1 and the level adjustment tank 3.

The fluid level in the level adjustment tank 3 is equal to the height of the balance level discharge pipe 332, and the float 4 and the carrier 2 and the plants P1 thereof are in a balanced state, such that the float 4 and the carrier 2 are respectively located on the fluid level of the adjustment solution 31 in the level adjustment tank 3 and the nutrient solution 11 in the hydroponic tank 1, and the roots of the plants P1 are dipped in the nutrient solution 11 for absorbing the nutrients required for growth.

Referring to FIG. 13b, when the user actuates the sinking type water pump 132 of the second discharge pipe 13 for discharging, and the pumped-out nutrient solution 11 is conveyed to the level adjustment tank 3, because the area of the fluid level of the hydroponic tank 1 and that of the level adjustment tank 3 are distinctly different, so the fluid level of the hydroponic tank 1 being slightly lowered would cause the fluid level of the level adjustment tank 3 to be raised from the original fluid level G to the water outlet fluid level G' of the dipper level discharge pipe 331, the float 4 is upwardly lifted 8 cm, and the small reel 551 releases the first drag rope 53a with the same distance, so the large reel 552 rotates through the same angle and winds the second drag rope 53b with a length three-time greater than the distance (24 cm, if the circumference ratio between the small and the large reels is 1:3), so the carrier 2 and the plants P1 thereof are dipped in the nutrient solution. 11.

When wishing to release the carriers 2 and the plants P1 thereof from dipping after a certain period of time in dipping, the balance level discharge pipe 332 is actuated for discharging, and the fluid level is gradually lowered to the water outlet height of the balance level discharge pipe 332, so the float 4 is enabled to float on the original fluid level G and release the first drag rope 53a and rotate the small reel 551, such that the carrier 2 is lifted through the second drag rope 53b being released by the large reel 552 so as to float on the fluid level of the nutrient solution 11.

Referring to FIG. 14, which is a first alternate form of the hydroponic system in accordance with the fourth embodiment of the present invention. According to this alternate form, the first drag rope 53a connected to the float 4 pass around the upper guide member 52 then is wound on the small reel 551, and the second drag rope 53b connected to the carrier 2 passes over the lower guide member 57 then is wound on the large reel 552. Thus, according to this alternate form, the relative relation of the carrier 2 and the plants P1 thereof and the float 4 is that the specific gravity of each float 4 and the average specific gravity of the carrier 2 and the plants P1 thereof are respectively smaller than that of the adjustment solution 31 and that of the nutrient solution 11, the gross weight of the float 4 is greater than the total buoyancy of the carrier 2 and the plants P1 thereof totally immersed in the nutrient solution 11 subtracting the gross weight of the carrier 2 and the plants P1 thereof then multiplying the circumference ratio between the large and the small reels. Accordingly, the float 4 and the carrier 2 can be synchronously raised or lowered in the level adjustment tank 3 and the hydroponic tank 1, wherein the technical characteristic of synchronous raising/lowering has been disclosed in the aforesaid embodiment, therefore no further illustration is provided.

What shall be addressed is that the disclosed embodiments and the alternate forms can be interactively applied with each other, thereby widening the application scope of the present invention.

Subject to the application of the present invention, the float and the carrier are respectively disposed in the level adjustment tank and the hydroponic tank, and each carrier and float are connected by a linkage mechanism for forming a linking state; because the summed area of the fluid level of the level adjustment tank is much smaller than that of the hydroponic tank, so by filling or discharging a small amount of adjustment solution in or out of the level adjustment tank, the height of the float in the level adjustment tank can be altered with the elevation of the fluid level, and with the linking effect provided by the drag rope, the carrier in the nutrient solution of the hydroponic tank can generate a lifting/sinking effect; as such, the level adjustment tank can greatly save the required water amount and shortens the operation time of water pump, thereby providing advantages of saving power and reducing carbon consumption; moreover, the stems and leaves of plants can absorbs nutrients for facilitating the growth of hydroponic plants and pests can be effectively drown or evicted.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims.

Although specific terms are employed herein, they are used in a generic and descriptive sense only and not for purposes of limitation.

What is claimed is:

1. A hydroponic system, comprising:
   at least one hydroponic tank, each hydroponic tank being filled with a nutrient solution and installed with at least one carrier for carrying or growing plants, an average specific gravity of each carrier and said plants thereof being greater than a specific gravity of said nutrient solution;
   at least one level adjustment tank, each level adjustment tank being filled with an adjustment solution and installed with at least a first water intake pipe and at least a first discharge pipe, a summed area a fluid level of said level adjustment tank being smaller than that of said hydroponic tank, and at least one float being provided in said level adjustment tank, a specific gravity of said float being smaller than that of said adjustment solution, and a gross weight of said float being greater than a gross weight of said carrier and said plants thereof subtracting a total buoyancy of said carrier totally immersed in said nutrient solution; and
   a linkage mechanism having at least one support member installed above said hydroponic tank and said level adjustment tank, said support member being installed with at least one upper guide member corresponding to locations of said float and said carrier, said upper guide member allowing a drag rope to be installed thereon, and two ends of said drag rope being respectively connected to said float and said carrier;

wherein said first water intake pipe and said first discharge pipe are utilized for respectively filling and discharging said adjustment solution in or out of said level adjustment tank, the height of said float in said level adjustment tank being altered with an elevation of the fluid level, and with a linking effect provided by said drag rope, said carrier and said plants thereof in said nutrient solution of said hydroponic tank generating a corresponding lifting/sinking movement at a same ratio.

2. The hydroponic system as claimed in claim 1, wherein said hydroponic tank is installed with at least a second water intake pipe and at least a second discharge pipe.

3. The hydroponic system as claimed in claim 1, wherein said float or said carrier is optionally combined with at least one weight.

* * * * *